US007725730B2

(12) United States Patent
Juels et al.

(10) Patent No.: US 7,725,730 B2
(45) Date of Patent: May 25, 2010

(54) CRYPTOGRAPHIC METHODS AND APPARATUS FOR SECURE AUTHENTICATION

(75) Inventors: Ari Juels, Brookline, MA (US); Burton S. Kaliski, Jr., Wellesley, MA (US)

(73) Assignee: EMC Corporation, Hopkinton, MA (US)

( * ) Notice: Subject to any disclaimer, the term of this patent is extended or adjusted under 35 U.S.C. 154(b) by 2014 days.

(21) Appl. No.: 10/216,030

(22) Filed: Aug. 9, 2002

(65) Prior Publication Data

US 2004/0030932 A1    Feb. 12, 2004

(51) Int. Cl.
| | |
|---|---|
| H04L 29/06 | (2006.01) |
| H04L 9/32 | (2006.01) |
| G06F 21/00 | (2006.01) |
| G06F 7/04 | (2006.01) |
| G06F 12/14 | (2006.01) |
| G08B 29/00 | (2006.01) |

(52) U.S. Cl. .................. 713/183; 713/151; 713/161; 713/168; 713/170; 713/184; 726/5; 726/7; 726/18; 726/19; 726/22; 726/28; 726/29; 726/30; 340/5.85

(58) Field of Classification Search ............... 726/5, 726/7, 18, 19, 22, 28–30; 713/151, 161, 713/168, 170, 183, 184; 340/5.85
See application file for complete search history.

(56) References Cited

U.S. PATENT DOCUMENTS

| 5,778,065 | A |  | 7/1998 | Hauser et al. |
|---|---|---|---|---|
| 5,862,323 | A |  | 1/1999 | Blakley, III et al. |
| 6,292,896 | B1 | * | 9/2001 | Guski et al. ............... 713/169 |
| 6,802,000 | B1 |  | 10/2004 | Greene et al. |
| 6,904,529 | B1 | * | 6/2005 | Swander ...................... 726/14 |
| 6,959,394 | B1 | * | 10/2005 | Brickell et al. ................ 380/44 |
| 6,978,385 | B1 | * | 12/2005 | Cheston et al. ............ 340/5.85 |
| 6,983,377 | B1 |  | 1/2006 | Beesley et al. |
| 6,986,039 | B1 |  | 1/2006 | Leah et al. |
| 6,996,719 | B2 |  | 2/2006 | Riordan |

(Continued)

FOREIGN PATENT DOCUMENTS

WO    PCTUS0325099    7/2008

OTHER PUBLICATIONS

Schneier, Bruce, Applied Cryptography, 1996, John Wiley & Sons, Inc., Second Edition, pp. 101-104.*

(Continued)

*Primary Examiner*—Aravind K Moorthy
(74) *Attorney, Agent, or Firm*—Ryan, Mason & Lewis, LLP

(57) ABSTRACT

Secure authentication protocols, particularly well-suited for use in authenticating mobile communications devices having limited computational resources, are disclosed. In an illustrative embodiment, a network-based communication system includes a client device and at least two servers. First and second shares are generated from a first password associated with the client device, and stored in respective first and second servers. The client device submits additional information associated therewith to at least one of the first and second servers. Each of the first and second shares has the property that it is infeasible to determine solely therefrom correspondence of the additional information with the first password. The first and second servers then utilize the respective first and second shares to collectively determine said correspondence of the additional information with the first password.

46 Claims, 7 Drawing Sheets

U.S. PATENT DOCUMENTS

| | | | |
|---|---|---|---|
| 7,003,673 B1 * | 2/2006 | Diener et al. | 713/190 |
| 7,007,164 B1 | 2/2006 | Euchner | |
| 2001/0038578 A1 * | 11/2001 | Oshima | 369/13 |
| 2002/0124177 A1 * | 9/2002 | Harper et al. | 713/189 |
| 2002/0129119 A1 * | 9/2002 | Aoki et al. | 709/217 |

OTHER PUBLICATIONS

U.S. Appl. No. 09/802,485, filed Mar. 9, 2001, "System and Method for Increasing the Security of Encrypted Secrets and Authentication."

U.S. Appl. No. 09/804,460, filed Mar. 21, 2001, "Server-Assisted Regeneration of a Strong Secret from a Weak Secret."

W. Ford et al., "Server-Assisted Generation of a Strong Secret from a Password," Proceedings of the IEEE 9th International Workshop on Enabling Technologies (WETICE), NIST, Gaithersburg MD, 5 pages, Jun. 2000.

P. MacKenzie et al., "Threshold Password-Authenticated Key Exchange," Research Papers on Strong Password Authentication, http://www.integritysciences.com/links.html, pp. 1-48, 2002.

K. Bicakci et al., Infinite Length Hash Chains and Their Applications, Procs. of the Eleventh IEEE International Workshops on Enabling Technologies: Infrastructure for Collaborative Enterprises (WETICE), 2002, pp. 57-61.

X. Wang et al., "An Intrusion-Tolerant Password Authentication System," Procs. of the 19th Annual Computer Security Applications Conference (ACSAC), 2003, pp. 110-118.

J. Boudreau et al., "Sun, Microsoft Join for Shared Passwords," Knight Ridder Tribune Business News, May 14 2005, 2 pages, Washington.

* cited by examiner

CRYPTOGRAPHIC METHODS AND APPARATUS FOR SECURE AUTHENTICATION

FIELD OF THE INVENTION

The present invention relates generally to cryptographic techniques for providing secure communication over computer networks or other communication media, and more particularly to cryptographic techniques particularly well-suited for use in secure roaming or other authentication applications involving mobile communication devices.

BACKGROUND OF THE INVENTION

The increasing mobility of users and growing use of a variety of computing devices has motivated widespread interest in secure roaming. Of particular importance is the ability of users to leverage short keys or other "weak" passwords to achieve secure functionality in conjunction with trusted servers. A very common aim of the roaming user is to download credentials from a trusted server onto a "lightweight" device, i.e., a device having limited processing power, memory or other computational resources. Such devices include, by way of example, mobile telephones, personal digital assistants (PDAs), game consoles, etc. Users of such devices may alternatively seek to delegate to the trusted server any cryptographic operations requiring intensive computing or careful key storage, such as digital signing and public-key-based decryption. Another important need for roaming users is that of password recovery or reset.

The roaming user may employ any of a number of different devices, not all of which necessarily possess the same software or configuration. While smart cards and similar key-storage devices offer a harmonized approach to security for the mobile user, they lack an adequately developed supporting infrastructure. At present, for example, very few computing devices contain smart card readers, particularly in the United States. Furthermore, many users find physical authentication tokens inconvenient. It also may be necessary to authenticate roaming users who have lost or forgotten their tokens. Today, this is commonly achieved by asking users to provide answers to a set of "life questions," i.e., questions regarding personal or private information. These observations stress the need to enable roaming users to employ short pieces of memorable information or other weak passwords as a form of authentication.

In many basic roaming protocols, passwords are stored in a central database, and consequently are vulnerable to theft en bloc in the event of server compromise. Such protocols are often based on secure password-authenticated key agreement (SPAKA). In a typical SPAKA protocol implementation, a client and server share a password, which is used to achieve mutual assurance that a cryptographically strong session key is shared privately by the two parties. To address the problem of weak passwords, SPAKA protocols are constructed so as to leak no password information, even in the presence of an active attacker. When used as a means of authentication to obtain credentials from a trusted server, a SPAKA protocol is typically supplemented with a throttling or lockout mechanism to prevent on-line guessing attacks. Many roaming-credentials proposals involve use of a SPAKA protocol as a leverage point for obtaining credentials, or as a freestanding authentication protocol.

As indicated above, however, the design of most SPAKA protocols overlooks the fundamental problem that the server itself represents a serious vulnerability. As SPAKA protocols require the verifying server to have plaintext access to user passwords or to derivative material, compromise of the server leads potentially to exposure of the full database of passwords. While many SPAKA protocols store passwords in combination with so-called "salt" or in an exponentiated form, an attacker still has the possibility of mounting off-line dictionary attacks. Additionally, these systems offer no resistance to server corruption. An attacker that gains control of the authenticating server can spoof successful login attempts.

To address the above-noted problems with conventional SPAKA-based techniques, Ford and Kaliski have proposed a collection of password "hardening" schemes involving multiple servers, with password privacy assured in the case that at least some servers remain uncompromised. See W. Ford and B. S. Kaliski Jr., "Server-Assisted Generation of a Strong Secret from a Password," Proceedings of the IEEE 9th International Workshop on Enabling Technologies (WETICE), NIST, Gaithersburg Md., June 2000, which is incorporated by reference herein. In their system, a client parlays a weak password into a strong one through interaction with one or multiple hardening servers, each one of which blindly transforms the password using a server secret.

As a more particular example, the client in one version of the Ford and Kaliski system obtains what may be regarded as a blind function evaluation $\sigma_i$ or "share" on its password P from each hardening server $S_i$. The function in question is based on a secret unique to each server and user account. The client combines the set of shares $\{\sigma_i\}$ into a single secret $\sigma$, which serves as a strong key that the user may then use in secure authentication applications, e.g., to decrypt credentials, to authenticate himself or herself, etc. Given an appropriate choice of blind function evaluation scheme, servers in this protocol may learn no information, in an information-theoretic sense, about the password P.

The Ford and Kaliski system has been extended to a threshold setting, leading to more complex protocols, but with rigorous security assurances in a broadly inclusive attack model, in P. Mackenzie et al., "Threshold Password-Authenticated Key Exchange," Research Papers on Strong Password Authentication, http://www.integritysciences.com/links.html, 2002, which is incorporated by reference herein. In particular, P. Mackenzie et al. demonstrate a protocol such that a client communicating with any k out of n servers can establish session keys with each of the k servers by means of password-based authentication, such that even if k−1 servers conspire, the password of the client remains private. Their system can be straightforwardly leveraged to achieve secure downloadable credentials.

The Mackenzie et al. system, however, imposes considerable overhead of several types. First, servers must possess a shared global key and local keys as well, for a total of 4n+1 public keys. The client, additionally, must store n+1 certified public keys. The client must perform several modular exponentiations per server for each session initiation, while the computational load on the servers is high as well. Finally, the Mackenzie et al. protocol is rather complex, both conceptually and in terms of implementation. On the other hand, the Mackenzie et al. protocol is apparently the first such protocol provided with a rigorous proof of security under the Decision Diffie-Hellman assumption in the random oracle model.

Despite their advantages, the known techniques described above have not fully satisfied the security needs of roaming users, particularly with regard to permitting those users to authenticate themselves in a secure and efficient manner using weak passwords communicated via lightweight devices.

SUMMARY OF THE INVENTION

The present invention provides methods and apparatus implementing secure authentication protocols that are particularly well-suited for use in mobile communications devices having limited computational resources.

In accordance with one aspect of the invention, a network-based system includes a client device and at least two servers. First and second shares are generated from a first password associated with the client device, and stored in respective first and second servers. Upon submission of additional information associated with the client device to at least one of the first and second servers, each of the first and second shares having the property that it is infeasible to determine solely therefrom correspondence of the additional information with the first password, the first and second servers utilize the respective first and second shares to collectively determine said correspondence of the additional information with the first password. An advantage of this arrangement is that the correspondence determination may be made without requiring further interaction between the client device and one or both of the servers. Another advantage is that the client device is not required to perform any significant cryptographic computation.

In accordance with another aspect of the invention, the additional information may comprise, by way of example, third and fourth shares on a second password associated with the client device. The additional information is then processed by the first and second servers comparing a first quantity generated by the first server as a function of the first and third shares with a second quantity generated by the second server as a function of the second and fourth shares. The first and second servers accept the additional information as authentic if the first quantity and the second quantity are determined to be substantially equivalent.

Other aspects of the secure authentication protocols of the invention relate, by way of example, to equality testing of the above-noted quantities computed by the servers, pseudonym protection of user identity at one or more of the servers, reduced complexity variants, n-server variants where n is greater than two, and polynomial-based authentication.

The secure authentication protocols of the present invention overcome one or more of the problems associated with the conventional techniques described previously, and permit users to authenticate themselves in a secure and efficient manner using weak passwords communicated via lightweight devices. These and other features and advantages of the present invention will become more readily apparent from the accompanying drawings and the following detailed description.

DETAILED DESCRIPTION OF THE PREFERRED EMBODIMENTS

The present invention will be described herein with reference to an example network-based communication system in which a client communicates over a network with one or more servers. It is to be appreciated, however, that the invention is not restricted to use in this or any other particular system configuration.

Additional details regarding certain conventional cryptographic techniques referred to herein may be found in, e.g., A. J. Menezes et al., Handbook of Applied Cryptography, CRC Press, 1997, which is incorporated by reference herein.

Example System

Figure 1:
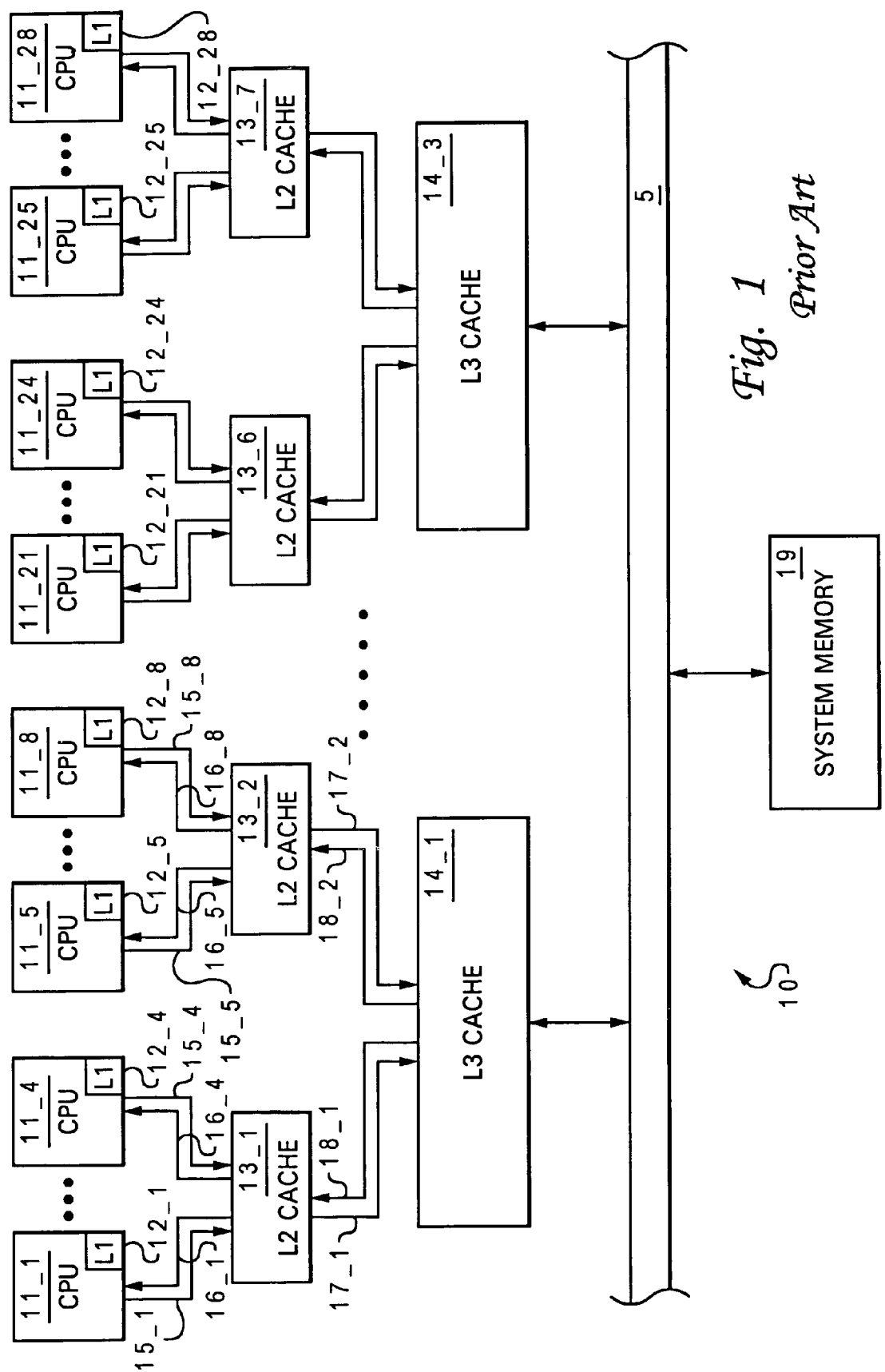
FIG. 1 is simplified block diagram of an example system in which the cryptographic techniques of the present invention may be implemented.

FIG. 1 shows a simplified network-based communication system 100 which will be used to illustrate the secure authentication techniques of the invention. The system 100 includes a client 102 and first and second servers 104R and 104B, respectively, all of which are configured to communicate over a network 106. For simplicity and convenience of notation, the first and second servers 104R and 104B are also referred to herein as the "Red" and "Blue" servers, respectively, and together comprise an example server pair which implements a portion of a secure authentication protocol in accordance with the invention. The denotation of a particular one of the servers 104 as the Red server and the other as the Blue server is arbitrary, as the roles of these servers may be reversed in the protocols to be described herein.

Although only a single client is shown in FIG. 1, it is expected that a practical implementation of the system 100 will support a substantially larger number of clients. Similarly, although only a single pair of servers is shown in FIG. 1, a system in accordance with the invention may include many such pairs of servers, as well as other arrangements of servers, e.g., a general number n of servers, where $n \geq 2$. The invention is therefore not restricted as to the particular number of client or server devices, nor does the invention require any particular pairings or other arrangement of server devices within the system.

The client 102 may represent a lightweight device, such as a mobile telephone, PDA, game console, etc. The client 102 may alternatively represent a desktop or laptop personal computer (PC), a microcomputer, a workstation, a mainframe computer, a wired telephone, a facsimile machine, a television set top box, or any other information processing device which can benefit from the secure authentication techniques of the invention. The client 102 may therefore also be implemented as a server. In other words, the invention, although particularly well-suited for use in applications in which roaming lightweight client devices authenticate themselves to servers, can be used for the secure authentication of any type of information processing device, including a device that is itself a server.

The client 102 may also be referred to herein as a user. The term "user" should be understood to encompass either a client device, a person utilizing or otherwise associated with the device, or both. An operation described herein as being performed by a user may therefore be performed by a device, a person utilizing or otherwise associated with the device, or by both the user and the device. Similarly, a password associated with a device may be a password of a user of the device. In this case, the password may be temporarily associated with the device upon entry of the password into the device by the user, as in the case of a device that serves multiple users each having different passwords.

The servers 104R and 104B may be implemented as otherwise conventional servers programmed to perform the secure authentication functions described herein, or as other types of suitably-programmed information processing devices.

The network 106 may represent a global computer network such as the Internet, a wide area network (WAN), a local area network (LAN), a satellite network, a telephone or cable network, or various portions or combinations of these and other types of networks.

As is apparent from the foregoing, the system 100 as illustrated in FIG. 1 may be viewed more generally as a system having at least three processing devices which are configured to communicate with one another and in which a given one of the devices authenticates itself to the other devices. The particular "client" and "server" labels provided for devices in FIG. 1 should thus be considered as examples only, and not limitations of the invention.

Figure 2:
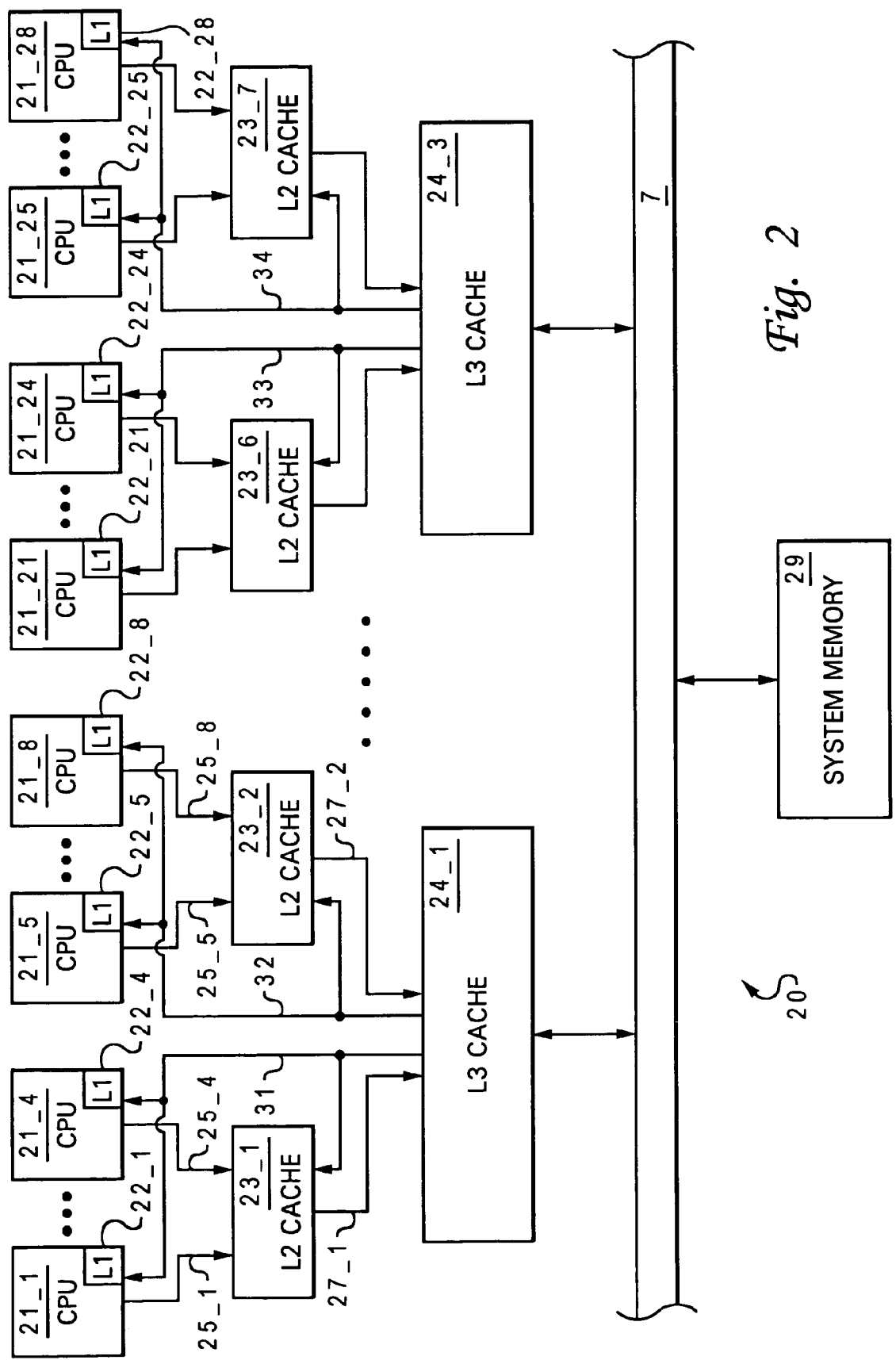
FIG. 2 illustrates one possible implementation of a given one of the client or server devices of the FIG. 1 system.

FIG. 2 shows one possible implementation of a given one of the processing devices 102, 104R, or 104B of the FIG. 1 system. The device in this implementation includes a processor 200 coupled to a memory 202 and a network interface 204. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, a secure authentication protocol in accordance with the present invention can be implemented at least in part in the form of one or more software programs that are stored in device memory 202 and executed by the corresponding processor 200. The memory 202 is also used for storing information used to perform computations or other operations associated with the secure authentication protocols of the invention.

As indicated previously, the present invention in accordance with one aspect thereof provides secure authentication techniques in which one device, such as client 102 of system 100 in FIG. 1, authenticates itself to a pair of other devices, such as servers 104R and 104B of the system 100. An example two-server secure authentication protocol in accordance with a first illustrative embodiment of the invention will be described below in conjunction with FIGS. 3 through 6. An alternative two-server embodiment having reduced computational complexity will then be described in conjunction with FIGS. 7 and 8. A multi-server variant and a number of other variants will then be described.

The invention in the illustrative embodiments to be described herein differs from the conventional SPAKA protocols described previously in that it does not itself provide mutual authentication of client and server. Instead, it provides particularly efficient techniques for a client to authenticate itself to multiple servers in a distributed manner, such that the computational burdens associated with conventional techniques are avoided. More particularly, an important advantage of the present invention relative to conventional techniques is that it can be implemented so as to require essentially no intensive cryptographic computation by the client device. Another advantage is that it can be implemented in a manner which requires no special-purpose software on the client device, and is thus fully compatible with current password submission techniques using hypertext mark-up language (HTML) forms or other similar mechanisms. The illustrative embodiment assumes server-side authentication, which may be implemented, by way of example, via the presentation of a server-side certificate, routing to a correct uniform resource locator (URL), or other techniques, as well as combinations thereof, as will be appreciated by those skilled in the art.

Two-Server Secure Authentication Protocol

Figure 3:
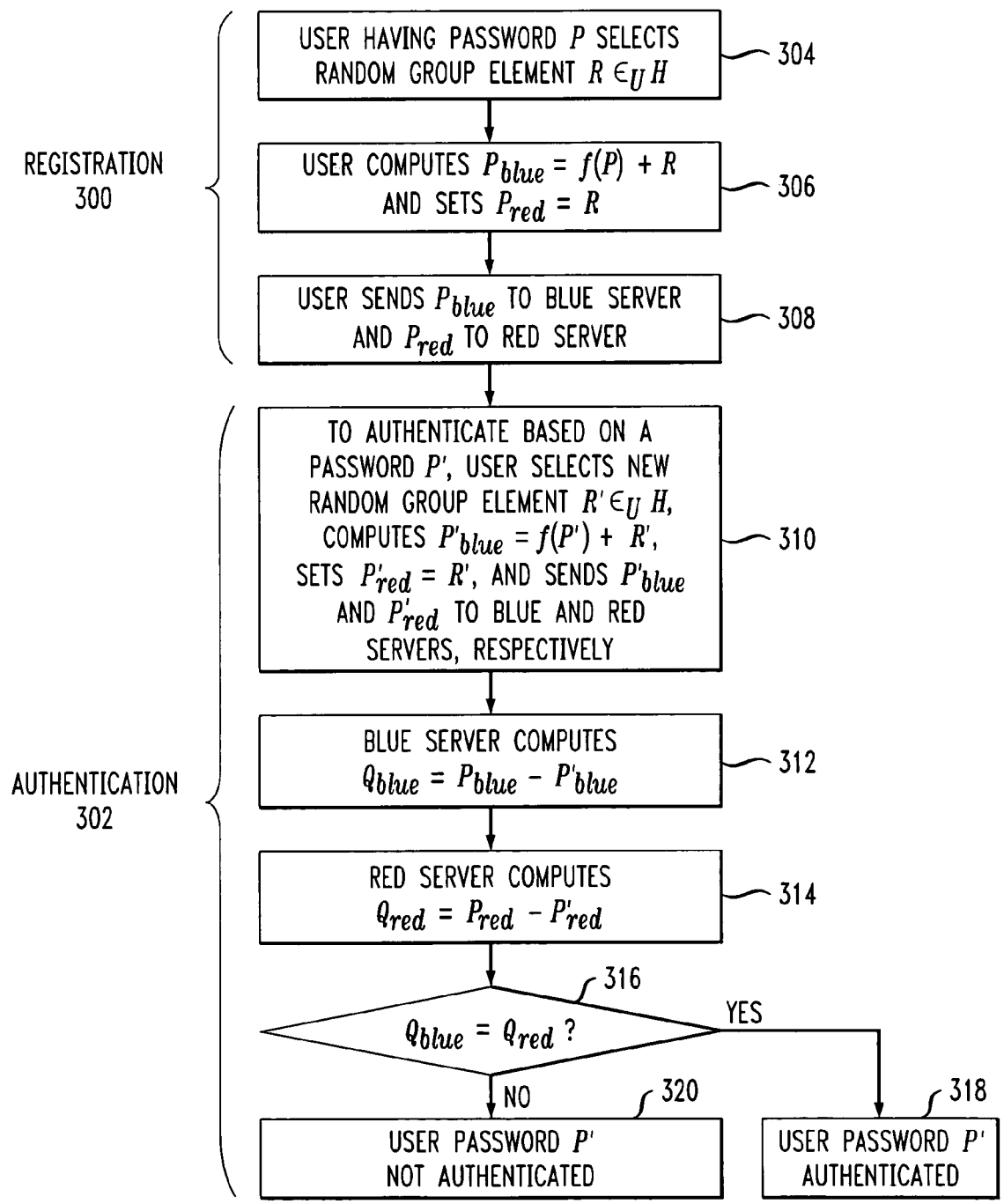
FIG. 3 is a flow diagram showing registration and authentication portions of an illustrative embodiment of a secure authentication protocol involving a client and a pair of servers in the FIG. 1 system, in accordance with the techniques of the invention.

FIG. 3 illustrates a two-server secure authentication protocol in accordance with a first illustrative embodiment of the invention. In this embodiment, a user associated with client 102 of FIG. 1 authenticates itself to the pair of servers 104R and 104B. As noted above, operations indicated as being performed by the user may be performed at least in part by the associated client device. The FIG. 3 diagram includes a registration portion 300 in which the user splits a password P into shares for the two servers, and an authentication portion 302 in which, on presenting password P' for subsequent authentication, the user provides the two servers with a new, random sharing of P'. The authentication portion of the process determines if the password P' is substantially equivalent to the registered password P. More particularly, as part of the authentication portion of the process in this illustrative embodiment, the servers compare the two sharings of P and P' in such a way that they learn whether P=P', but no significant additional information, even if one of the servers tries to cheat.

The password P' is an example of what is more generally referred to herein as "additional information," and in this illustrative embodiment represents information submitted by the user or an associated device subsequent to registration of the password P. It should be understood, however, that "additional information" as the term is used herein may be any type of information.

The illustrative embodiment of FIG. 3 is configured such that each of the shares of the password P has the property that it is infeasible to determine solely from the given share correspondence of the password P' with the password P. As indicated above, in the authentication portion 302, the two servers utilize the respective first and second shares to collectively determine the correspondence of the password P' with the password P. The term "correspondence" as used in this context herein is intended to include, by way of example and not limitation, full or exact correspondence between first and second pieces of information, or partial correspondence indicating, e.g., that a relationship exists between first and second pieces of information beyond that which would be present if the pieces of information were simply selected at random.

It should be noted that a given password may be preprocessed by a client device using conventional techniques before it is submitted to the registration and authentication portions of the FIG. 3 protocol. The resulting output of such a preprocessing operation is also referred to herein as a password.

The term "password" as used herein is thus intended to be construed broadly so as to include, by way of example and without limitation, any piece of data suitable for use in authentication, such as an actual word, a sequence of numbers, letters or other symbols, a binary code, a cryptographic key, a personal identification number (PIN), a secret, a passcode, an answer to a life question or a set of such answers, a user profile or a portion thereof, one or more values associated with an RSA SecurID® token, or the like.

The term "share" is intended to include, by way of example and without limitation, a portion of a password.

The registration portion 300 of the secure authentication protocol includes steps 304, 306 and 308. Let H be a large group (of, e.g., 160-bit order), and + be the group operator. Let $f$ be a collision-free hash function $f \{0, 1\}^* \rightarrow H$. In step 304, the user selects a random group element $R \in_U H$. The user in step 306 then computes the share $P_{blue}$ for the Blue server 104B as $P_{blue} = f(P) + R$, while the share $P_{red}$ of the Red server 104B is set to R. In step 308, the shares $P_{blue}$ and $P_{red}$ are sent to the respective Blue and Red servers. Observe that the share of either server individually provides no information about the password P.

It should be noted that legacy data may be converted into shares and loaded into the servers in a straightforward manner by simulating the above-described registration portion of the protocol. Such legacy data may also generally be converted into shares in other roaming authentication protocols via this same simulation approach.

The authentication portion 302 of the secure authentication protocol includes steps 310 through 320. In step 310, the user initiates authentication based on the password P' by selecting a new random group element $R' \in_U H$, computing $P'_{blue} = f(P') + R'$, setting $P'_{red}$ to R', and sending $P'_{blue}$ and $P'_{red}$ to the Blue and Red servers 104B and 104R, respectively.

The Red and Blue servers then combine the shares provided to them during registration with those provided to them for authentication as follows. In step 312, the Blue server computes $Q_{blue} = P_{blue} - P'_{blue} = (f(P) - f(P')) + (R - R')$, while in step 314 the Red server similarly computes $Q_{red} = P_{red} - P'_{red} = R - R'$. Observe that if P=P', i.e., if the user has provided the correct password, then $f(P)$ and $f(P')$ cancel, so that $Q_{blue} = Q_{red}$. Otherwise, by the collision intractability of $f$ the result is that $Q_{blue} \neq Q_{red}$. Thus, in order to test the user password submitted for authentication, the two servers need merely test, as indicated in step 316, whether $Q_{blue} = Q_{red}$, preferably without revealing any additional information. If the test in step 316 confirms that $Q_{blue} = Q_{red}$, the user password P' is accepted and the authentication is complete, as indicated in step 318, and otherwise the password is rejected and the authentication fails, as indicated in step 320.

It should be noted that other embodiments of the invention may be configured to determine authenticity based on substantial equivalence, rather than exact equivalence as previously described.

As described above, the function $f$ maps a password to a large group. In practice, this may be accomplished with a hash function, appropriately modified so that its output is in the designated group. For instance, if H is the group of 160-bit strings under the bitwise XOR operation, then a 160-bit hash function would be appropriate. Alternatively, if H is a multiplicative group with 160-bit elements, then some modular reduction may need to be applied to the output of the hash function. If H is a group with longer elements (e.g., 1024-bit elements) than the output of the hash function, then some expansion of the output of the hash function may be needed. One way to achieve the expansion is to apply a mask generation function such as MGF1, in RSA Laboratories' Public-Key Cryptography Standard (PKCS) #1, Version 2.1, June 2002, available at http://www.rsasecurity.com/rsalabs/pkcs/.

In addition to the password, other inputs may be provided to the function $f$. The input may also include a non-secret salt value, as is conventional as a countermeasure against dictionary attacks. The non-secret salt value could be generated by the client or one of the servers during the registration portion 300, stored with other information about the user at one of the servers, and provided to the client during the authentication portion 302. The input may also include other fixed parameters such as the user's name and the name of the servers to associate the output of the function $f$ with those parameters.

In the foregoing, it has been assumed that the function $f$ is one-way. However, it is also possible to construct a system in which the function $f$ is invertible. The advantage of such a construction is that the password P (or other secret) can be recomputed from the shares $P_{blue}$ and $P_{red}$. In this case, the function $f$ would to map the password P to a group element in an invertible fashion. If H is the group of 160-bit strings under the bitwise XOR operation, and P is shorter than 160 bits, then a simple padding format would be appropriate.

In practice, the client has a number of options for providing values such as R and R' to Red. As one example, the client may distribute the value directly to Red through a private channel established with Red under Red's public key. As another, the client may establish a "base" value through a private channel, where the client and Red derive one or more values such as R or R' from the base value via a one-way function. This latter option has the advantage that the client and Red need only establish one base value during a given session, from which multiple values such as R and R' may be derived. For instance, if there are multiple life questions, a different value may be derived from the same base value by including a question index in the input to the one-way function. If the client makes multiple attempts to answer a life question during a given session, a different value may be derived for each attempt by including an attempt index in the input to the one-way function. More specifically, a value $R'_{ij}$ for the $i^{th}$ question, $j^{th}$ attempt may be obtained by applying a one-way function to the base value and the indices i and j.

If Red has an RSA public key (n, e) where n is the modulus and e is the public exponent, one way to establish a base value is through a variant of the RSA-KEM technique described in V. Shoup. "A Proposal for an ISO Standard for Public Key Encryption (Version 2.1)," http://shoup.net/papers/, Dec. 20, 2001, which is incorporated by reference herein. In this variant, the client generates a random integer r between 0 and n−1, encrypts r with Red's public key to obtain $c = r^e \mod n$, and sends c to Red. A base value may now be derived from the integer r via a one-way function. Red decrypts c with its private key to recover r and similarly derives a base value. Alternatively, the integer r itself may be considered as the base value. Analogous techniques are possible based on other public-key cryptosystems.

In all the foregoing examples, other parameters may be included in the input to the one-way function, such as the names of Red and Blue, a timestamp, Red's public key, the ciphertext c, and so on, as is generally considered beneficial to associate the derived values with the parameters.

Note that in the FIG. 3 protocol, the client is not required to perform any significant cryptographic computation. The protocol is therefore well-suited for use with lightweight client devices. It should be noted, however, that the client may perform some cryptographic computation to establish secure connections with the Red and Blue servers. For example, if the well-known secure sockets layer (SSL) approach is used in establishing connections between the client and the servers, the RSA encryption utilized would involve just a small number of modular multiplications. Moreover, once the client has submitted the shares in step 310, it need have no further involvement in the authentication portion of the process. The Red and Blue servers together decide on the correctness of the password submitted for authentication. Given a successful authentication, one or both of these servers can then perform one or more post-authentication actions on behalf of the user. For example, each server can send a share of a private key for the user, the two servers can issue separate pieces of a signed credential, or the servers can jointly produce a digital signature or credential, etc.

The equality testing in step 316 will now be described in greater detail. An example equality-testing protocol, for use in performing the equality testing in step 316, will be described in conjunction with FIG. 4. The equality testing makes use of a second, large group G of order q, for which we let multiplication denote the group operation. The group G should be one over which the discrete logarithm problem is hard. We assume that the two servers have agreed upon this group in advance, and also have agreed upon and verified a generator g for G. We also utilize a collision-free mapping w: H→G. For equality testing of the values $Q_{blue}$ and $Q_{red}$, the idea is for the two servers to perform a variant of Diffie-Hellman key exchange. In this variant, however, the values $Q_{blue}$ and $Q_{red}$ are "masked" by the Diffie-Hellman keys.

The resulting equality-testing protocol may be viewed as a technical simplification of the PET protocol described in M. Jakobsson and A. Juels, "Mix and Match: Secure Function Evaluation Via Ciphertexts," ASIACRYPT '00, LNCS No. 1976, T. Okamoto, editor, Springer-Verlag, pp. 162-177, 2000, which is incorporated by reference herein. However, the equality-testing protocol uses only one component of an El Gamal ciphertext, instead of the usual pair of components as in PET. The equality-testing protocol also shares similarities with SPAKA protocols such as encrypted key exchange (EKE). For example, one may think of the equality $Q_{blue}=Q_{red}$ as resulting in a shared secret key, and inequality as yielding different keys for the two servers. However, we do not seek to derive a shared key from the protocol execution, but merely to test equality of two secret values with a minimum of information leakage.

The equality-testing protocol further assumes a private, mutually authenticated channel between the two servers. A particular one of the servers, assumed in this example to be the Blue server, is designated as the "initiating server." The equality-testing protocol is configured such that if the initiating server tries to establish multiple, concurrent authentication sessions for a given user account, the other server will refuse. In particular, in the FIG. 4 protocol, the Red server will reject the initiation of a session in which the first flow specifies the same user account as for a previously established, active authentication session. Additionally, either server will permit only a single active authentication session against any given user account. Alternative approaches permitting concurrent login requests for a single account are possible, but more complicated. If the Blue server initiates an authentication request with the Red server for a user U for which the Red server has received no corresponding authentication request from the user, then the Red server, after some appropriate delay, rejects the authentication.

Let $Q_{blue,U}$ denote the current share combination that the Blue server wishes to test for user U, and $Q_{red,U}$ the analogous Red server share combination for user U. For either server, we let "reject" denote a rejection and termination of the authentication session purporting to come from user U, and "accept" denote an acceptance of the session as originating with user U.

Figure 4:
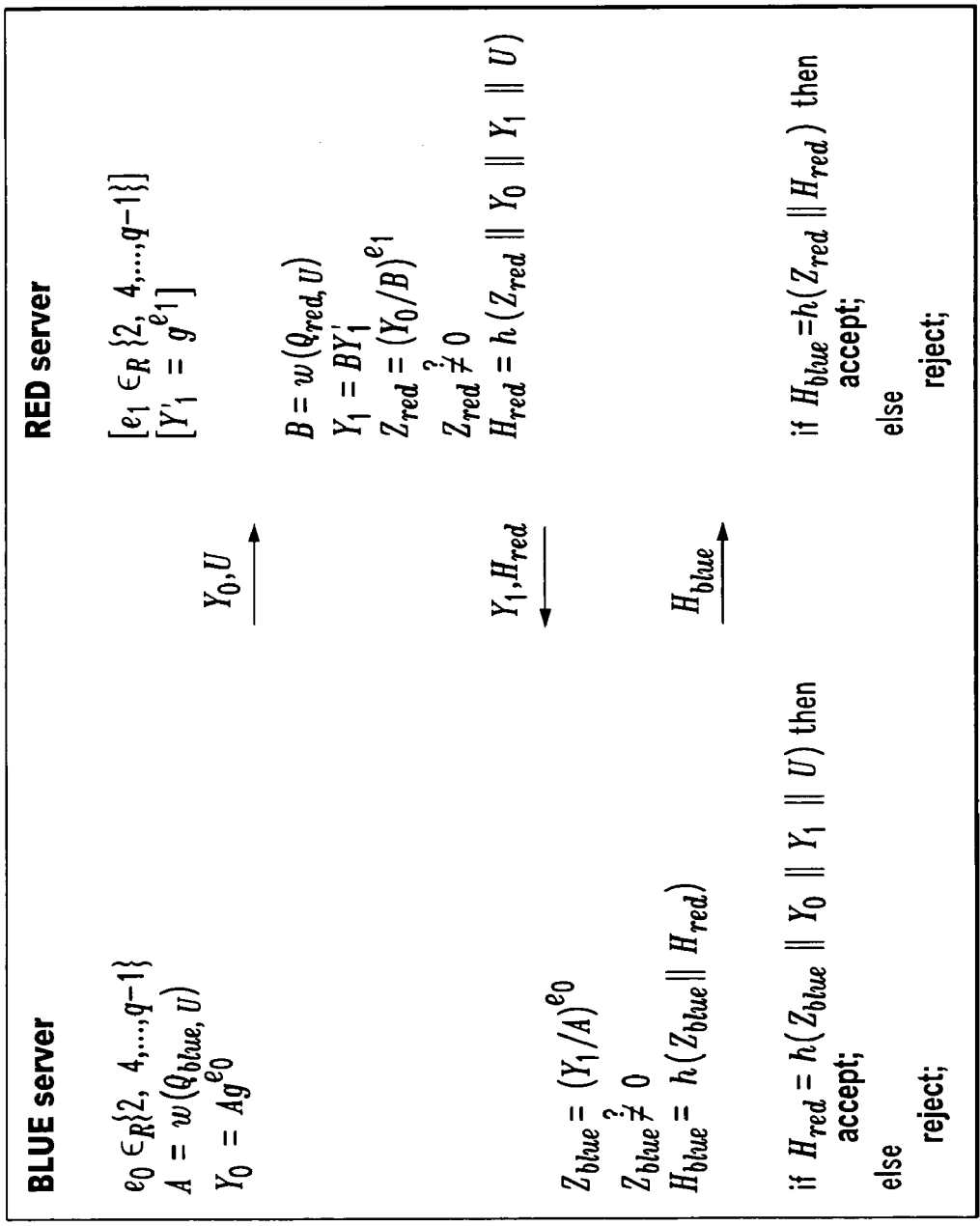
FIG. 4 shows an equality-testing protocol for use in the authentication portion of the FIG. 3 protocol in accordance with the invention.

In the FIG. 4 protocol as well as any other protocols described herein, if a server fails to validate any mathematical relation denoted by $\stackrel{?}{=}$, $\stackrel{?}{\neq}$, or $\stackrel{?}{\in}$, it determines that a protocol failure has taken place.

We let $\epsilon_R$ denote uniform random selection from a set. We indicate by square brackets those computations that Red may perform prior to protocol initiation by Blue, if desired. We use subscripts red or 1 to denote values computed or received by Red, e.g., $Z_{red}$, $Y_1$, $Y_1'$, $H_{red}$, etc., and blue or 0 for those of Blue, e.g., $Z_{blue}$, $Y_0$, $H_{blue}$. We alternate between these forms of notation for visual clarity. We let h denote a one-way hash function, which may be modeled for security analysis by a random oracle. In the case where a system may include multiple Blue and/or Red servers, the hash $H_{red}$ should include the server identities as well. We let || denote string concatenation.

For the sake of simplicity, we fix a particular group G for the example equality-testing protocol of FIG. 4. In particular, we consider G to be the prime subgroup of order q in $Z_p$, for prime p=2q+1. Use of this particular group is reflected in the FIG. 4 protocol by: (1) use of even exponents $e_0$ and $e_1$ to ensure group membership in manipulation of transmitted values; and (2) membership checks over {2, ..., p−2}. For other choices of group, group membership of manipulated values may be ensured by other means, as will be readily apparent to those skilled in the art. All arithmetic is performed modulo p.

With reference to FIG. 4, Blue selects $e_0$ at random from the set {2, 4, ..., q−1}, computes $A=w(Q_{blue,U})$ and $Y_0=Ag^{e_0}$. Red selects $e_1$ at random from the set {2, 4, ..., q−1}, and computes $Y_1'=g^{e_1}$. Blue sends $Y_0$ and U to Red, and Red computes $B=w(Q_{red,U})$, $Y_1=BY_1'$, and $Z_{red}=(Y_0/B)^{e_1}$. Red checks if $Z_{red}\neq 0$, and then computes $H_{red}$ as the hash function h applied to the string concatenation of $Z_{red}$, $Y_0$, $Y_1$ and U. Red sends $Y_1$ and $H_{red}$ to Blue, and Blue computes $Z_{blue}=(Y_1/A)^{e_0}$. Blue checks if $Z_{blue}\neq 0$, and then computes $H_{blue}$ as the hash function h applied to the string concatenation of $Z_{blue}$ and $H_{red}$. Blue sends $H_{blue}$ to Red. Blue accepts if $H_{red}$ is equivalent to the result of applying hash function h to the string concatenation of $Z_{blue}$, $Y_0$, $Y_1$ and U, and otherwise rejects. Red accepts if $H_{blue}$ is equivalent to the result of applying hash function h to the string concatenation of $Z_{red}$ and $H_{red}$, and otherwise rejects.

A suitable choice for p in the FIG. 4 protocol is a 1024-bit prime, although other values can be used. One may achieve greater efficiency by selecting shorter exponents $e_0$ and $e_1$, e.g., 160 bits. Alternatively, other choices of group G may yield higher efficiency. One possibility, for example, is selection of G as an appropriate group over an elliptic curve. This yields much better efficiency for the exponentiation operations, and also has an efficient test of group membership. For H, we can simply select the group consisting of, e.g., 160-bit strings, with XOR as the group operator. This has the advantage of requiring no modular arithmetic by registering or authenticating clients. Numerous other approaches are possible for selecting G or H.

For the mapping w from the group H to the group G, the techniques involving hash functions and mask generation functions above may be applied. If G is an elliptic curve group, an initial mapping of the identifier to a point may not yield a group element (not all points are on the curve) but as is well known in the art, variant mappings can be applied, typically just a small number, until a group element results.

It should be noted that all of the information flows between the Blue and Red servers can pass through the client. Integrity protection on these flows serves the purpose of protecting against a malicious client in the case where both servers are honest. Encryption of the flows serves to protect against disclosure of pseudonyms. Flows may also pass through the client in an alternative multiple-server variant to be described below, again with the use of encryption and integrity protection.

It should also be noted that that two-server protocol of FIGS. 3 and 4 assumes fully private channels between the client and the two servers.

In terms of security, it can be shown that an adversary with control of one of the two servers and an arbitrary set of users can do essentially no better in attacking the accounts of honest users than random, on-line guessing. Attacks involving such guessing may be contained by means of standard throttling mechanisms, e.g., shutting down a given account after three incorrect guesses. Using the above-noted random-oracle assumption on the hash function and an appropriate model, the security of the above-described system may be reduced to the computational Diffie-Hellman assumption on the group G.

Robustness against simple server failures may be achieved straightforwardly through duplication of the Red and Blue servers.

The security of the two-server protocol of FIGS. 3 and 4 depends on the ability of an attacker to compromise both Red and Blue. Heterogeneity in server configurations is thus an important practical security consideration here. At the simplest level, the Red and Blue servers may run different operating systems, thereby broadening the range of technical obstacles confronting the would-be attacker. A further step in this direction would be to situate Red and Blue within different organizations, with the hope of minimizing the risk of insider or social-engineering attacks.

The distribution of security across organizations also provides an appealing model of risk management in which legal and financial responsibility for compromise can be flexibly allocated. In particular, we can view this as a form of privacy outsourcing, in which one of the two servers, e.g., the Blue server, is operated by a service provider and the other, the Red server, is operated by what may be referred to as a "privacy provider." The privacy provider may be an organization with specialized expertise that is willing to assume the primary burden of security maintenance and likewise to assume a large portion of the legal and financial liability associated with privacy breaches.

For a service provider to adopt this approach in a way appealing to a large and potentially mobile user population, there are two salient requirements. The first is universality, that is, there should be no need for clients to install special-purpose software. In particular, clients should be able to interface with the system by way of standard browser components such as HTML and Java. The second requirement is pseudonymity, that is, the privacy provider, Red in this example, should be unable to gain explicit access to the user names associated with accounts. At a minimum, clients should be able to interact with this server pseudonymously, i.e., by way of identifiers unlinkable with true account names or IP addresses. This provides a technical obstacle to abuse of account information on the part of the operator of Red. It is also useful to employ pseudonyms in this way so as to limit exposure of account identifiers in case of compromise of Red.

In view of the pseudonymity requirement, particularly the notion that Red should not learn the IP addresses of clients, the privacy provider should preferably operate Red as a back-end server, i.e., a server that only interacts with other servers, not clients. Another motivation for this configuration is its emphasis on security for Red. In the outsourcing model, the major burden of liability and security is on Red, and the privacy provider is the primary source of security expertise. Hence it is desirable to isolate Red from open communication on the Internet, restricting its interaction instead to one or more Blue servers. This configuration is also helpful in minimizing the exposure of Red to denial-of-service attacks, which Blue, having better familiarity with its own user base, is better equipped to handle.

It should be noted in this context that Red and Blue may alternatively be configured in accordance with an enterprise model, in which Red and Blue are controlled by different groups within an enterprise, or otherwise separated in an appropriate manner.

The requirement of universality argues that the software for the secure authentication protocol, while perhaps installed on some clients as a browser plug-in or standalone executable, should also be available in the form of a Java applet. This applet might be dispensed by Blue or, alternatively, an additional server. The applet would contain the software to execute the client portion of the basic two-server protocol of FIG. 3, and may also contain a public key for Red. This public key would serve to establish a private channel to Red via Blue.

Distribution of such applets by Blue raises an immediate concern in that Blue if compromised might serve bad applets. In particular, an attacker that has compromised Blue in an active fashion can cause that server to distribute applets that contain a false public key for Red, or indeed that do not even encrypt shares intended for Red. The problem of trusted software is present even for SPAKA protocols, given the need of roaming clients to install such software on the fly. Applets or other software may be digitally signed, but most users are unlikely to understand how to employ browser-provided verification tools to check the correctness of the associated code-signing certificate. Rather, we make the following observations on this issue. First, active compromise of core components of Blue is likely to be much harder than passive compromise. Also, use may be made of system integrity checker tools that are designed specifically to detect hostile code modification. Additionally, the task of an attacker in compromising Blue in this way is harder than active compromise in traditional cryptographic settings, in that any observer can in principle detect the compromise by inspecting applets. Thus, the privacy provider might periodically initiate authentication requests with Blue to monitor its integrity. Another complementary approach is for Red to distribute to interested clients a piece of software that verifies the hash of code served by Blue.

A more serious concern arises in conjunction with the pseudonymity requirement. To meet this requirement, Blue must identify a given user name U to Red according to a fixed pseudonym V. One possible attack, then, is for Red to pose as a client authenticating under identifier U, and then see which associated pseudonym V Blue asserts. Red thereby learns the linkage between U and V. There is effectively no practical way to defend against this type of attack. Instead, we rely on social factors to forestall such behavior on the part of Red. For example, as the service provider, it is Blue that will hold the list of account names, so that these may be difficult for Red to accumulate en bloc. In addition, given the risk of damaged reputation, Red should be averse to mounting an attack against pseudonyms. Of course, use of pseudonyms is still beneficial in that passive compromise of Red will not reveal true account identifiers.

More serious still, however, is the possibility of a massive on-line false-pseudonym attack by a corrupted Blue server. In particular, Blue might create an arbitrarily large set of fictitious accounts on Red under false pseudonyms $\tilde{V}_1, \tilde{V}_2, \ldots$, with a dictionary of passwords of its choice. It can then replay authentication requests by a given client against the pseudonyms $\tilde{V}_1$, $\tilde{V}_2$, . . . . By repeating replays until it achieves a match, Blue thereby learns the secret information for account U. This attack is particularly serious in that it might proceed indefinitely without detection. Behavior of this kind would not be publicly detectable, in contrast for instance to the attack involving distribution of bad applets.

Figure 5:
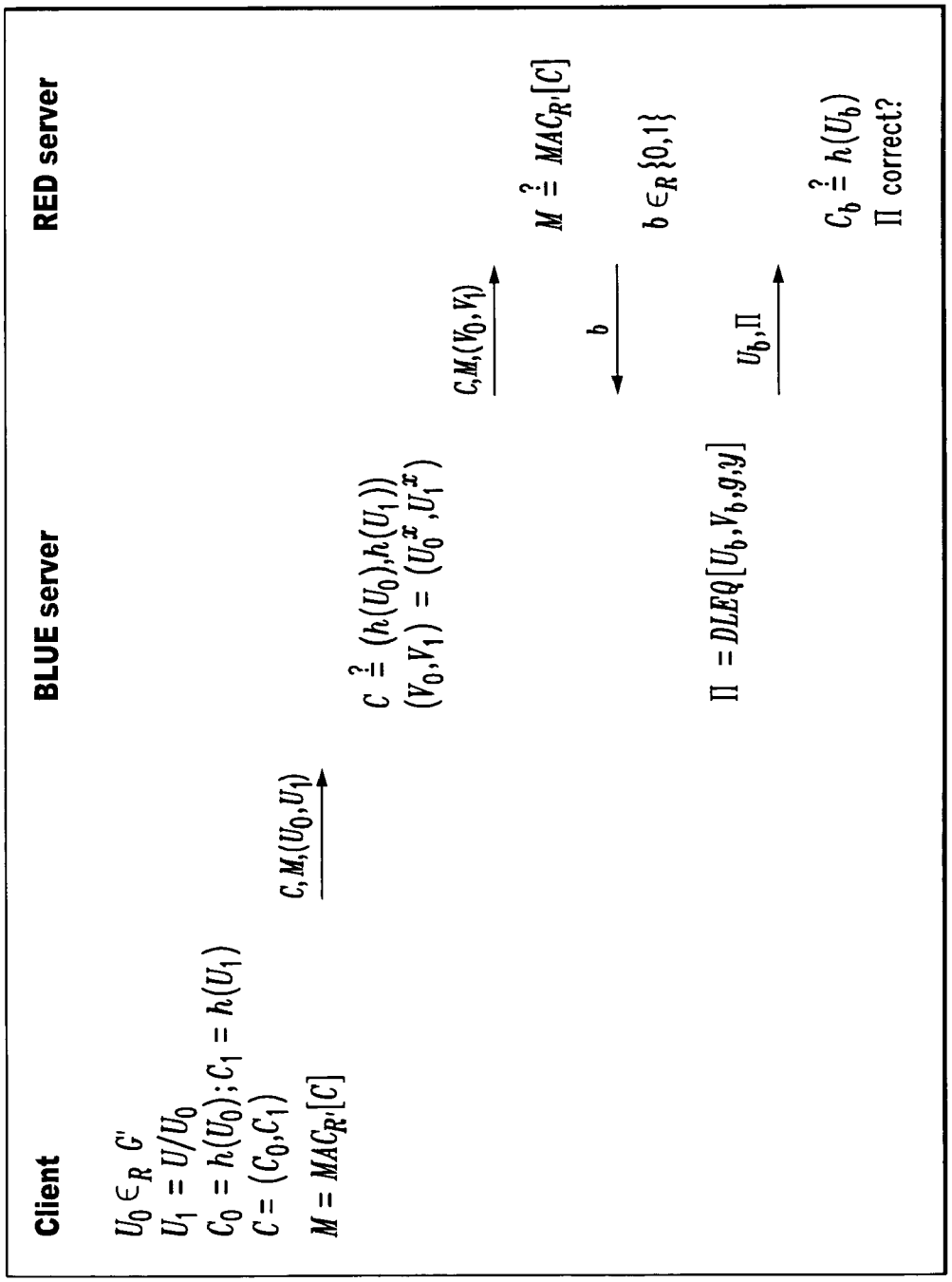
FIG. 5 shows a pseudonym-proof protocol for use in the authentication portion of the FIG. 3 protocol in accordance with the invention.

To address this problem, one may require that Blue use a secret, static, one-way function $f$ to map user identifiers to pseudonyms. Blue, in conjunction with the client, then proves to Red for every authentication request that it is asserting the correct pseudonym. One challenge in designing a protocol employing this proof strategy is that the client cannot be permitted to learn the pseudonym for any account until after it has authenticated. Otherwise, Red can learn pseudonyms by posing as a client. A second challenge is to design a proof protocol that is lightweight for Red, Blue, and especially for the client. FIG. 5 shows an example of such a pseudonym-proof protocol. This example protocol requires no intensive cryptographic computation by the client, just a modular inversion and a number of symmetric-key computations.

The basis of the FIG. 5 pseudonym-proof protocol is a one-way function which comprises a modular exponentiation of the form $f_x$: $m \to m^x$ in a group G' of order q' over which the Decision Diffie-Hellman problem is hard. This choice of one-way function has a number of especially desirable features. First, it is possible to prove statements about the application of $f$ by employing standard non-interactive zero-knowledge proofs on discrete logs. In addition, the function $f_x$ has a multiplicative homomorphism, namely $f_x(a)f_x(b)=f_x(ab)$. In order to keep $f_x$ secret, the value x is preferably an integer held privately by Blue. We let $y=g^x$ denote a corresponding public key distributed to Red.

It should be noted that short exponents may be used in the modular exponentiation operation, as described in, for example, P. C. van Oorschot and M. J. Wiener, "On Diffie-Hellman Key Agreement with Short Exponents," EUROCRYPT 1996, pp. 332-343, which is incorporated by reference herein.

To render the pseudonym-proof protocol lightweight for the client, we utilize a "cut-and-choose" proof strategy. The idea is that a client identifier U is represented as a non-trivial group element in G'. The client computes a random, multiplicative splitting of U over G' into shares $U_0$ and $U_1$; thus $U=U_0 U_1$. The client also computes commitments $C_0$ and $C_1$ to $U_0$ and $U_1$, respectively, and transmits these to Blue. Blue computes V by application of $f_x$ to each of the shares $U_0$ and $U_1$. In particular, Blue sends to Red the values $V_0=f_x(U_0)$ and $V_1=f_x(U_1)$. Observe that by the multiplicative homomorphism on $f_x$, Red can then compute the pseudonym $V=f_x(U)=f_x(U_0)f_x(U_1)=V_0 V_1$.

The representation of the client identifier U as a group element can be achieved in any of several standard ways. If the group G' is a multiplicative group modulo a prime, the identifier can be mapped to an integer element of the group, by applying a hash or mask generation function as discussed above, or directly, if the identifier has the appropriate size. As also noted above, standard techniques are available if the group is an elliptic curve group.

To prove that this pseudonym V is the right one, Red sends a random challenge bit b to Blue. Blue then reveals $U_b$ and proves that $V_b=f_x(U_b)$. The probability that a cheating Blue is detected in this protocol is extremely close to ½ under the appropriate cryptographic assumptions. Thus, if Blue attempts to mount a pseudonym attack, say, 80 times, this will be detected by Red with overwhelming probability. This cut-and-choose pseudonym-proof protocol, therefore, renders the threat of such an attack by Blue much smaller than the threat of a rogue client that submits password guesses.

One feature of the FIG. 5 pseudonym-proof protocol is that the client must authenticate its commitment to the pair of shares ($U_0$, $U_1$), so that Red knows that Blue did not tamper with it. To achieve this, the client applies a message authentication code (MAC) under R', i.e., the password share it sends to Red. For simplicity, we assume in FIG. 5 that Red receives R' privately, without explicitly including the transport mechanism in the figure. We let $\Pi$=DLEQ[a, b, c, d] denote a non-interactive zero-knowledge proof of knowledge of the equivalence $\log_a b = \log_c d$ over the group G'. If Blue fails to verify the equivalence $C \stackrel{?}{=} (h(U_0), h(U_1))$, then the authentication request fails, even before Blue and Red test the submitted password. Similarly, if Blue determines that $U_0$ and $U_1$ are not correct shares of U, then Blue rejects the request. If Red fails to verify $C_b \stackrel{?}{=} h(U_b)$ or fails to verify the proof $\Pi$, then Red concludes that Blue has been corrupted. If Red fails to verify $M \stackrel{?}{=} MAC_{R'}[C]$, then Red concludes that either the client has submitted an invalid request or else Blue has tampered with M. In either case, Red does not permit or engage in password verification for the account identified by pseudonym V.

The quantity y in FIG. 5 is given by $y=g^x$, and may be viewed as representing a public key of Blue, where x represents a private key of Blue.

In FIG. 5, the client sends the shares $U_0$ and $U_1$ to Blue as well as the commitments $C_0$ and $C_1$. However, it is necessary only that the client send information to Blue sufficient to determine those values. For instance, the client may send only $U_0$. Since Blue knows U, Blue can determine $U_1$ as $U/U_0$ over G'. Assuming the commitments are computed deterministically, Blue can recompute them from $U_0$ and $U_1$. Similarly, it is necessary only that Blue send information to Red sufficient to determine $V_0$, $V_1$, $C_0$, $C_1$, V, and subsequently $U_0$ or $U_1$. For instance, rather than sending $V_0$, and $V_1$, Blue may send $V_0$ and V, where Red recomputes $V_1$ as $V/V_0$ if needed.

It is possible that the commitments may not be computed deterministically, based on other techniques for commitments such as those involving El Gamal encryption. In this case, typically the client would send the commitments to Blue, and Blue would verify the commitments without recomputing them, perhaps by interaction with another party (for example, Red).

Here and elsewhere, notation such as $MAC_{R'}[C]$ should be understood generally as indicating an appropriate authentication of a value C with a key R' shared by the client and Red. As is well known in the art, the MAC key may be a different key derived from R'. More generally, the MAC key may be a different key derived from a base value established between the client and Red, similar the examples as discussed above. The input to the MAC may contain, in addition to the value C, some context information indicating the intent of the MAC (i.e., that it is for authenticating the value C, as opposed to a value of another type, as in another application of the MAC with the key R' described elsewhere herein). Alternatively, if several values are to be authenticated with the key R', then the MAC may be computed on an appropriate input representing the several values with the key R' or a related key. Also, in general, other parameters may be included in the input to the one-way function, as is generally considered beneficial to associate the transaction with the parameters.

Figure 6:
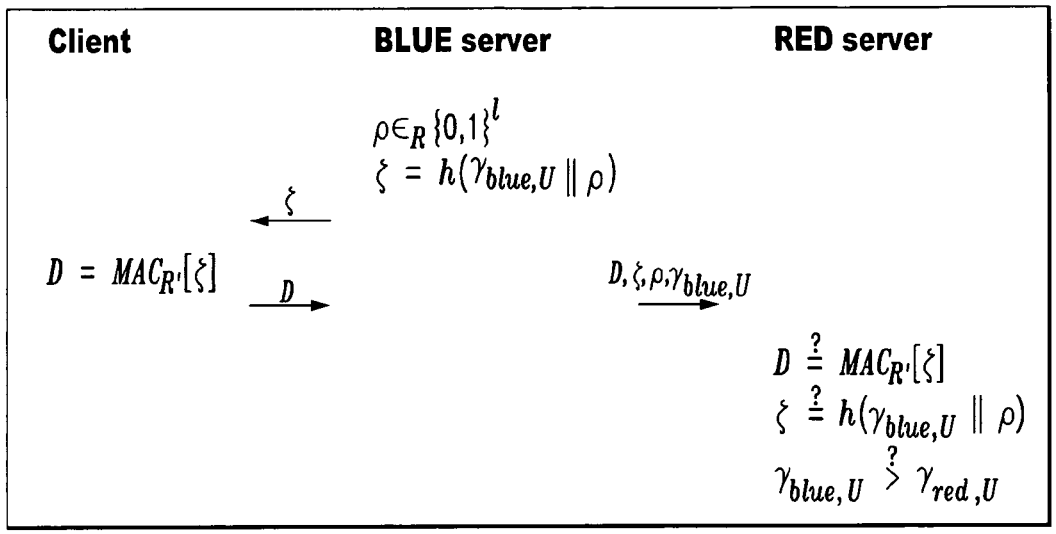
FIG. 6 shows a replay countermeasures protocol for use in conjunction with the FIG. 5 pseudonym-proof protocol.

FIG. 6 shows a replay countermeasures protocol that may be used in conjunction with the pseudonym-proof protocol of FIG. 5. As will be described below, this protocol is designed to protect the system against replay attacks.

In the case where the client communicates directly with Red and Blue via private channels, an adversary in control of either server does not have the capability of mounting a replay attack, as it has access to data derived from only one share. In the above implementation, however, where the client communicates with Red via Blue, this is no longer the case. Indeed, without some additional mechanism to ensure the freshness of the share sent by the client to Red, an adversary in control of Blue can mount a replay attack simply by repeating all communications from the client. While the adversary would not learn the password P this way, the adversary could falsely simulate a successful authentication.

A simple countermeasure is to employ timestamps. In particular, Blue may transmit the current time to the client. Along with its other information, the client then transmits a MAC under R' of this timestamp. Provided that Red stores for each user password the latest timestamp accompanying a successful authentication, Red can verify the freshness of a share it receives by verifying that the associated timestamp postdates the latest one stored for the password. A drawback of this approach, however, is the engineering complexity introduced by time synchronization requirements.

An alternative approach involves the use of counters. In this approach, Blue and Red maintain for each user password a counter logging the number of successful authentication attempts. Blue, then, provides the most recent counter value to the client at the time of login, and the client transmits a MAC under R' of this counter as an integrity-protected verifier to be forwarded to Red. Using this verifier, Red can confirm the freshness of the associated login request.

The drawback of the above-described counter approach is its leakage of account information. An attacker posing as a given user can learn the counter value for the password of the user, and thus gather information about the login patterns of the user. An adversary controlling Red can moreover harvest such counter values without initiating authentication attempts and thus without the risk of alerting Blue to potentially suspicious behavior. By matching these counter values against those stored by Red, such an adversary can correlate pseudonyms with user identities.

It is important, therefore, not to transmit plaintext counter values to clients. Instead, Blue can transmit to an authenticating client a commitment $\zeta$ of the counter value $\gamma$ for the claimed user identity. See, for example, M. Blum, "Coin flipping by telephone," Proc. of 24th IEEE Compcon, pp. 133-137, 1982, which is incorporated by reference herein. The client then furnishes a MAC under R' of $\zeta$ with its login information, to be forwarded to Red. On initiating an authentication request, Blue provides to Red the counter value $\gamma$ and a witness $\rho$ associated with $\zeta$. The two pieces of data $\gamma$ and $\rho$ together decommit the associated counter value. In this way, the client does not learn $\gamma$, but the integrity of the binding between the counter value $\gamma$ and a given authentication request is preserved.

A hash function represents an efficient way to realize the above-described commitment scheme, and is computationally binding and hiding under the random oracle assumption. In particular, Blue may commit $\gamma$ as $\zeta = h(\gamma \| \rho)$, where the witness $\rho \in_R \{0, 1\}^l$ is a random bitstring of length l, for appropriate security parameter l. In a typical implementation, l is preferably at least 160 bits in length. To decommit, Blue provides $\gamma$ and $\rho$, enabling Red to verify the correctness of $\zeta$.

The above-described protocol is depicted in FIG. 6. The flows associated with this protocol may be overlaid on those of one or more of the other protocols previously described, such as the pseudonym-proof protocol of FIG. 5 as utilized in the authentication portion of the FIG. 3 protocol.

In the FIG. 6 protocol, $\gamma_{blue,U}$ denotes the counter value stored for the password account of the user U attempting login and $\gamma_{red,U}$ denotes the corresponding counter value as stored by Red. At the conclusion of the FIG. 6 protocol, on successful authentication by the client, Blue increments $\gamma_{blue,U}$ by one and Red increments $\gamma_{red,U}$ by one. The quantity D in the figure denotes the above-described MAC under R' of $\zeta$.

Referring again to the pseudonym-proof protocol of FIG. 5, Blue can reduce its computational load by storing V in a database entry for account U. On an authentication request against U, Blue then computes $V_0 = f_x(U_0)$ and $V_1 = V/V_0$. Another possible optimization is to have the client commit to $U_0$ and $U_1' = U U_0$ (as opposed to $U_1 = U/U_0$) and send the pair $(U_0, U_1')$ to Blue. This enables the client to reduce its computational load by substituting a modular multiplication for a computationally more expensive modular inversion. The remainder of the FIG. 5 protocol must be modified accordingly in this case.

The flows in the pseudonym-proof protocol of FIG. 5 can be overlaid in a natural way on top of those in the basic authentication and equality-testing protocols described above in conjunction with FIGS. 3 and 4, respectively. In particular, the client submits its authentication information and pseudonym-proof information to Blue, including an encrypted share for Red. Blue then executes the equality-testing protocol of FIG. 4 with Red. This, like the pseudonym-proof protocol of FIG. 5, is a three-flow protocol. The two may therefore be executed concurrently in the course of three flows. The replay countermeasures protocol of FIG. 6 can likewise be conveniently integrated into the other protocols.

Although the pseudonym proof protocol of FIG. 5 and the replay countermeasures protocol of FIG. 6 are described here in the context of authentication protocols involving two or more servers, they have more general application in other settings. For instance, they may be applied to provide privacy to users of a back-end server (represented by Red) via a front-end server (represented by Blue). The common element is that the client assures Red its intent to perform a certain transaction, such that Blue cannot impersonate the client. However, neither the client, nor Red, learns the client's pseudonym.

It should be noted that it is possible to reduce the operational requirements on Red still further by offloading most of the contents of its database onto Blue. In particular, Red may store each account record on Blue encrypted under a secret key held by Red. When an authentication request for a given account is initiated, then Blue sends the appropriate encrypted record to Red. To ensure the freshness of records, Red may store a counter for each account, and bind the current counter value to the most recent record. This may be accomplished by, e.g., applying a MAC to the record and counter value under the secret key of Red. Alternatively, Red may just store the hash of the most recent record for each account.

We note that a stronger proof of correct pseudonym formation by Blue is possible with additional cryptographic computation by the client. In an example of this alternative approach, the client constructs what is essentially a kind of blinded El Gamal ciphertext on its identity. To authenticate with user identifier U, the client constructs a ciphertext $(\alpha, \beta) = (\gamma^k, Ug^k)$, where $k \in_R Z_q$. Observe that a conventional El Gamal ciphertext on U would assume the form $(Uy^k, g^k)$, i.e., the plaintext U would be multiplied into the first, rather than the second component of the pair.

The ciphertext $(\alpha, \beta)$ has the property that under standard El Gamal decryption the associated plaintext is not U, but $U^x$. In other words, $\alpha/\beta^x = U^{-x} = 1/V$. It follows that $\beta_x = V\alpha$. Hence in this scheme the client is able to construct a ciphertext on the inverse of the pseudonym V=ƒ(u) without knowing V or the secret one-way function $f_x$. After constructing (α, β), the client authenticates it for Red by applying a MAC using a key based on the password share it sends to Red. Blue, then, when it sends this share to Red, asserts account pseudonym V=$f_x$(U). Blue proves that V is correct by providing a non-interactive zero-knowledge proof that 1/V is the plaintext corresponding to (α, β). This proof assumes the form DLEQ[g, y, β, V α].

More generally, the client may construct a ciphertext ($y^k$, $U^d g^k$), for some integer d that is preferably relatively prime to q'. In this case, the associated plaintext under standard El Gamal decryption would be $V^{-d}$ and the proof would take the form DLEQ[g, y, β, $V^d$ α]. If d=−1, for instance, then the associated plaintext would be V itself.

It is also possible to use a weaker pseudonym proof. For example, a much simpler way for the Red server to verify the correctness of pseudonyms by Blue is for Red to accompany its record of a pseudonym V by a commitment $C_U$=C(U, W) to a corresponding account identifier U under a witness W, where the commitment $C_U$ is computed during registration. The account identifier U need not belong to a particular group in this approach, while the witness W may be derived by Blue as, e.g., h(W,σ) for a one-way function h and value σ held secretly by Blue.

On authenticating, the client binds the account identifier U to its authentication request. This is possible, for example, using an approach like that employed in the FIG. 5 protocol, in which the client supplies a MAC on U under the key R'. Blue proves the correctness of the associated pseudonym V to Red simply by supplying the witness W, which enables verification relative to the commitment $C_U$. This approach is simpler and more efficient than the cut-and-choose proof described above in conjunction with FIG. 5. It has the disadvantage of permitting ephemeral exposure of account identifiers to Red. In other words, in this approach, Red sees the account identifiers associated with authentication requests, and must be trusted to erase them securely.

Another possible approach to preventing pseudonym attacks is for Red to keep a record of authentication requests within a certain time window parameterized by τ. In this approach, the client includes a time-dependent value in its request, and cryptographically binds it to any subsequent retries within a given session. Red regards as expired any request older than time τ. Thus, Blue can in this case only direct a given authentication against a single pseudonym, i.e., it can mount a pseudonym attack only once per session from the user on a given account. Should Blue mount many pseudonym attacks, Red might detect this as a result of users reporting unusual and seemingly erroneously patterns of failed authentication attempts. Detection of this kind, however, is uncertain. Another drawback to this approach is the complexity of the implementation details.

It is expected that some classes of clients may be unable to execute Java applets. Such clients are referred to herein as "zero-footprint clients." These may include, for example, clients running antiquated or reduced-functionality browsers and clients with very restrictive security settings. It is possible to accommodate such clients by deploying a third server, which may be called "Green" for simplicity of description. Green would accept the password from the client over a private channel, e.g., an SSL link. It would then execute the protocols described above on behalf of the client and subsequently erase the password. This, of course, significantly undercuts the security available in the Red/Blue server configuration, resulting as it does in ephemeral exposure of submitted passwords. Use of the Green server, however, still results in a system whose overall security is superior to that of conventional single-server password-based authentication systems. Single-server systems already possess the vulnerabilities induced by ephemeral password exposure. Additionally, however, they also permit a passive attacker to harvest the hashes of all passwords in the server database, enabling offline dictionary attacks. In contrast, the only form of compromise of Green is through the ephemerally exposed passwords. Thus a successful attack against Green would need to be persistent if it is to reveal a significant number of passwords. We note that Green can be deployed most simply not as a separate server, but as a module on Blue.

Poor-Man's Variant

An even simpler approach to supporting zero-footprint clients is a reduced-complexity variant of the FIG. 3 protocol, referred to herein as the "poor-man's variant." This reduced-complexity secure authentication protocol is configured such that not only the client but the servers themselves perform substantially no computationally intensive cryptographic operations. Like the FIG. 3 protocol, the poor-man's variant includes a registration portion and an authentication portion. The registration and authentication portions of the poor-man's variant will be described below in conjunction with FIGS. 7 and 8, respectively.

In the poor-man's variant, the client reveals the password P in explicit form to a front-end server, which executes the split on behalf of the client, and then erases P. This variant can be deployed with no special-purpose software; passwords can be submitted, for example, via an HTML browser. Assuming that the private channel between the client and the front-end server has forward secrecy, previously submitted passwords remain private even if the front-end server's state is fully compromised.

Figure 7:
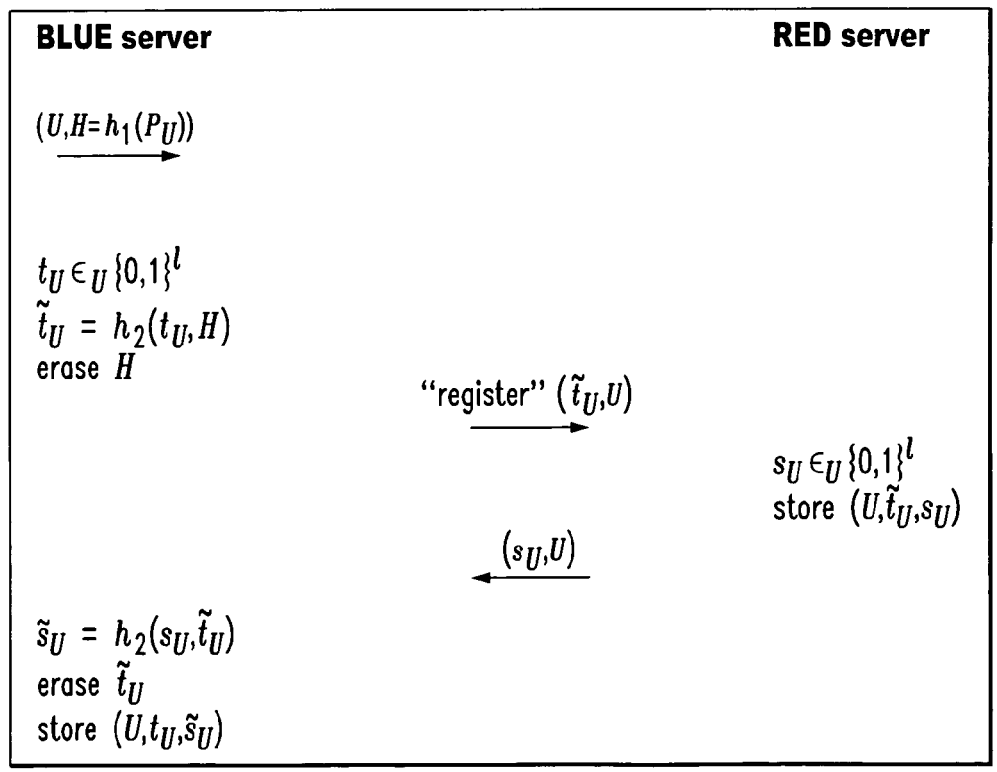
FIGS. 7 and 8 show respective registration and authentication portions of a secure authentication protocol in accordance with an alternative embodiment of the invention having reduced computational complexity relative to the FIG. 3 embodiment.

FIG. 7 shows the registration portion of the poor-man's variant. The user is assumed to prove his or her identity using a conventional "out-of-band" method, and these interactions are not shown in the figure. Blue and Red then create an indirect sharing of a user-furnished password $P_U$ through hashing with random bitstrings of length l, where l is a security parameter. We assume that U is unregistered on either server here; otherwise the servers follow their appropriate respective policies for re-registration attempts. We let $h_1$ and $h_2$ denote collision-intractable one-way functions. We provide explicit guidance as to steps in which erasure should take place of secret values based on the user password P. It can be seen that H, the hash of P, is erased prior to erasure of $t_U$, a secondary hash based on P. This offers the minor advantage of not keeping H in the memory of Blue while it awaits a reply from Red. An attacker can still mount a dictionary attack on $t_U$ during this period, but at least does not have direct access to H.

Figure 8:
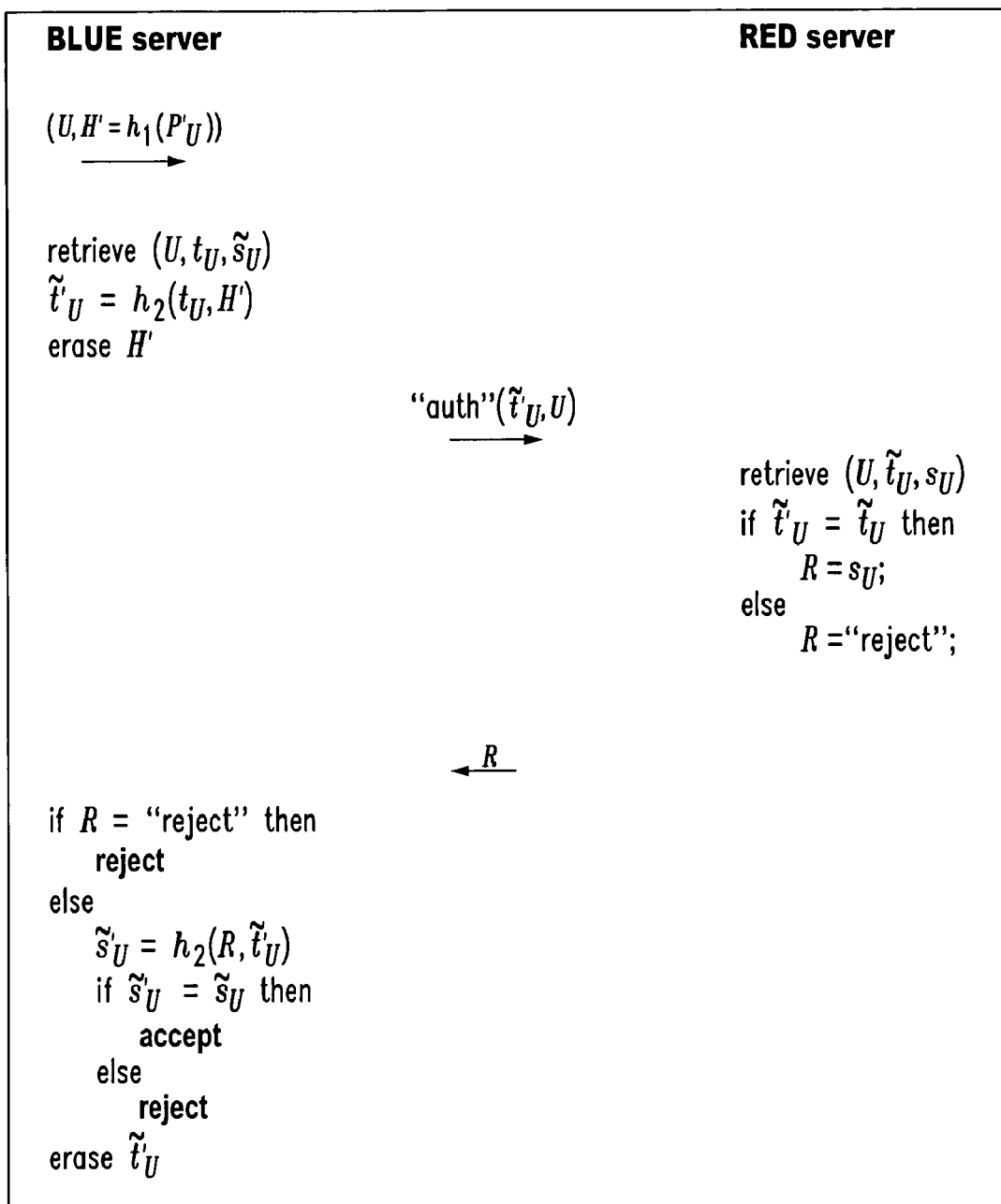
Figure 1:
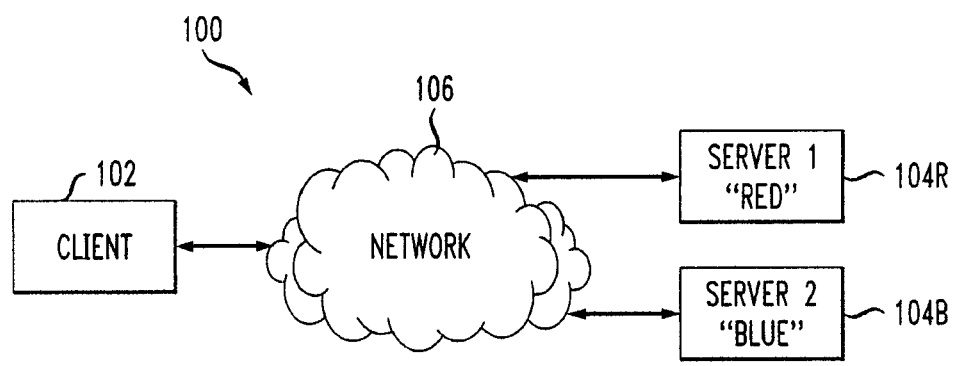
Figure 2:
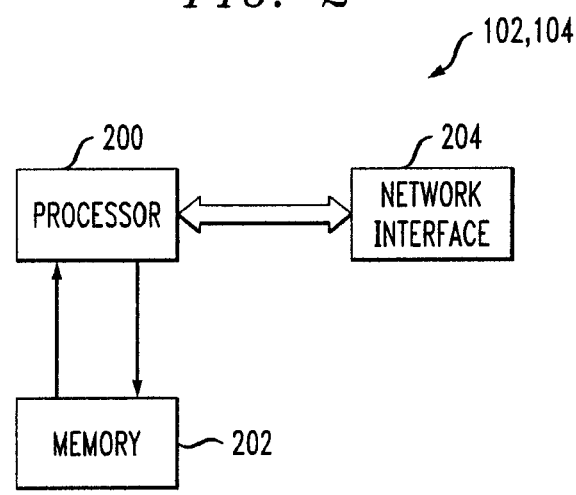
Figure 2:
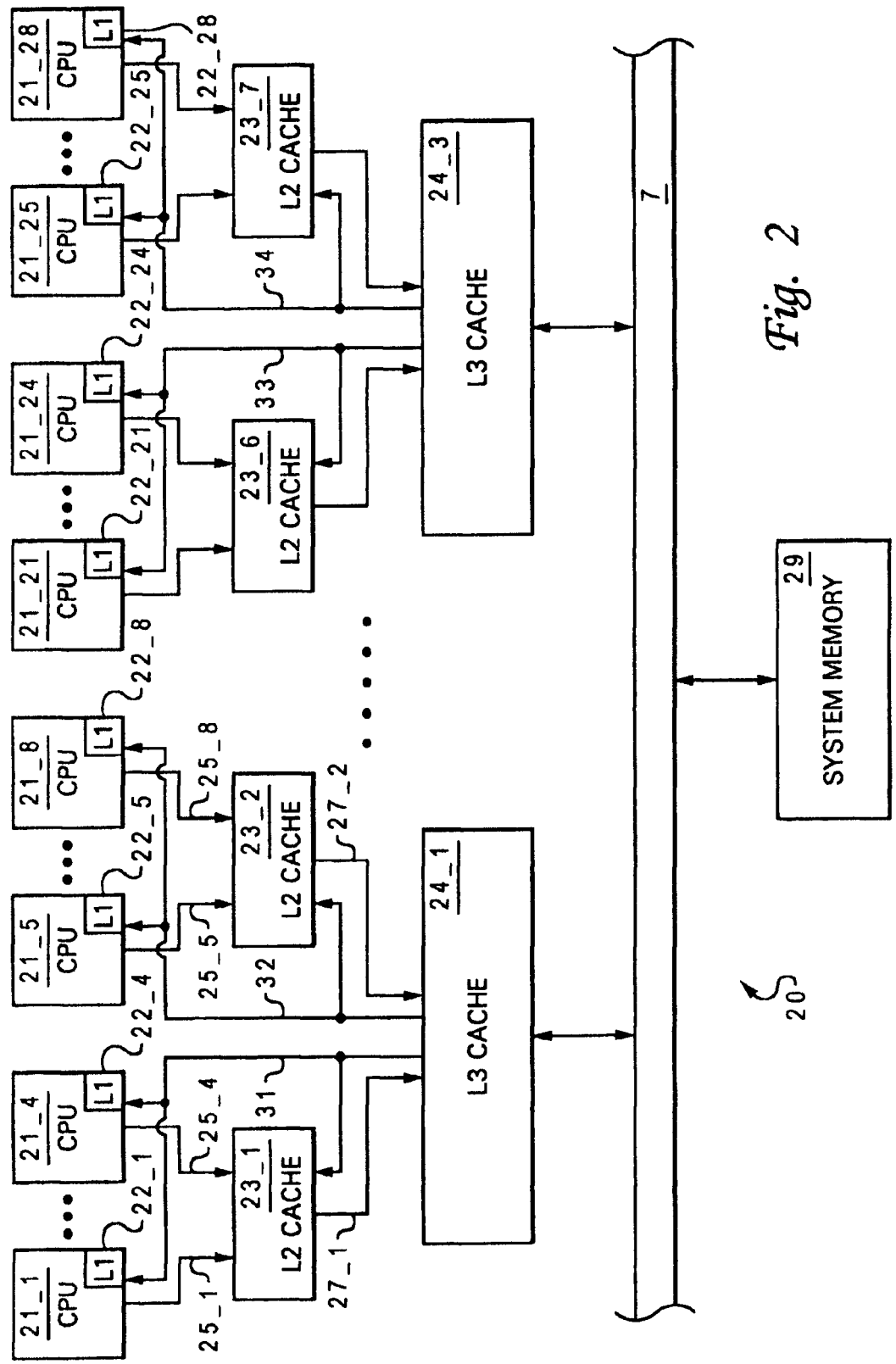
Figure 3:
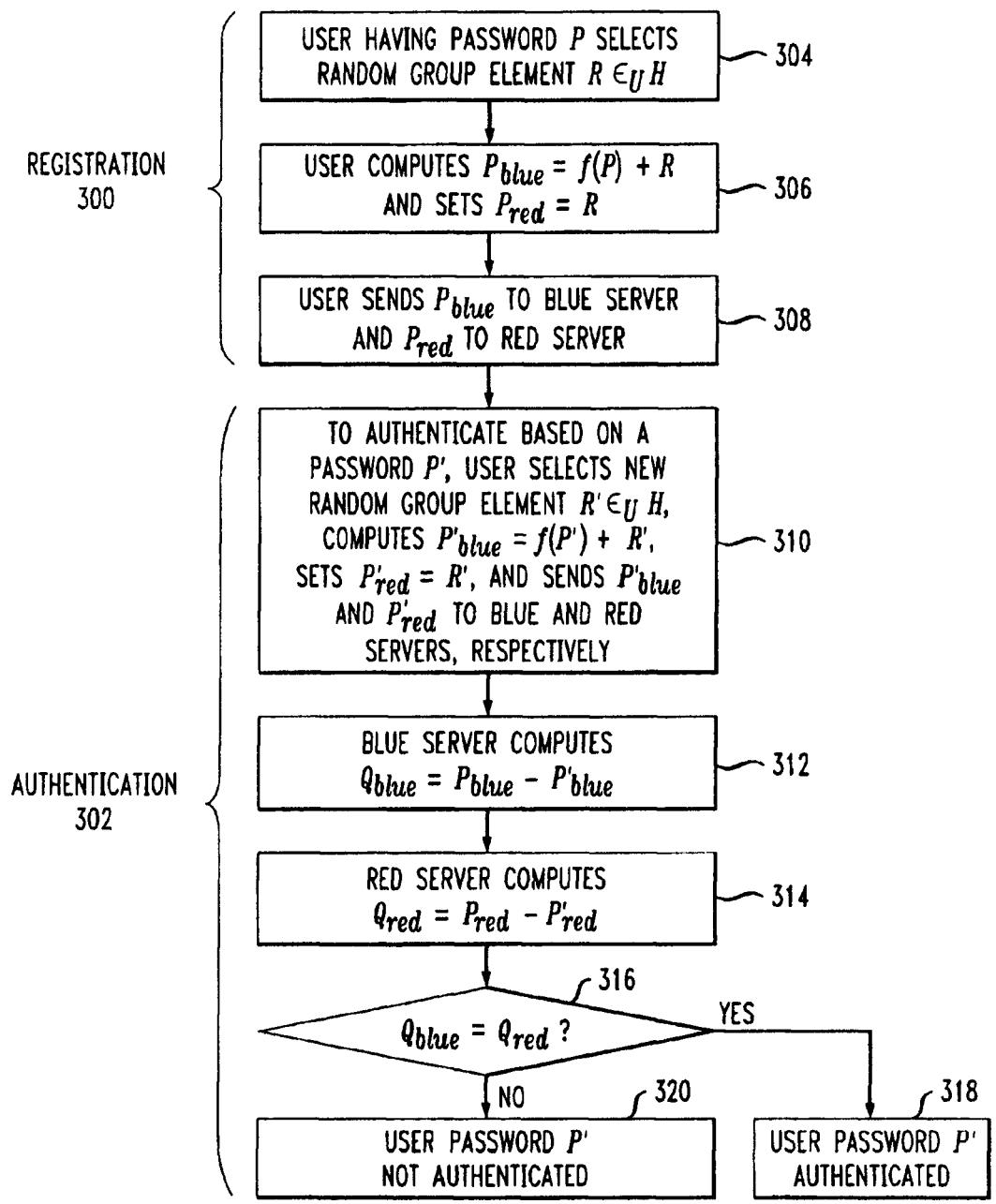
Figure 4:
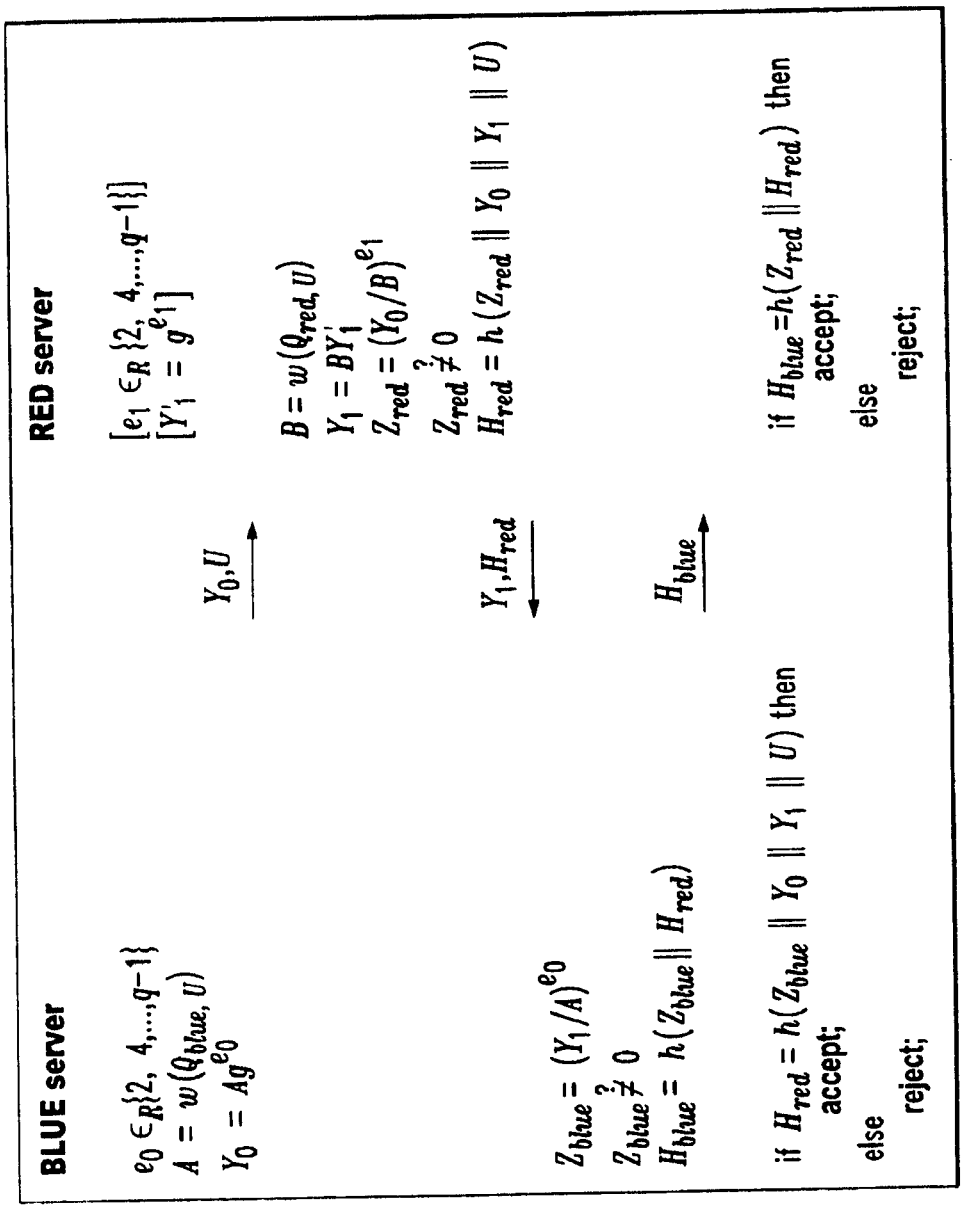
Figure 5:
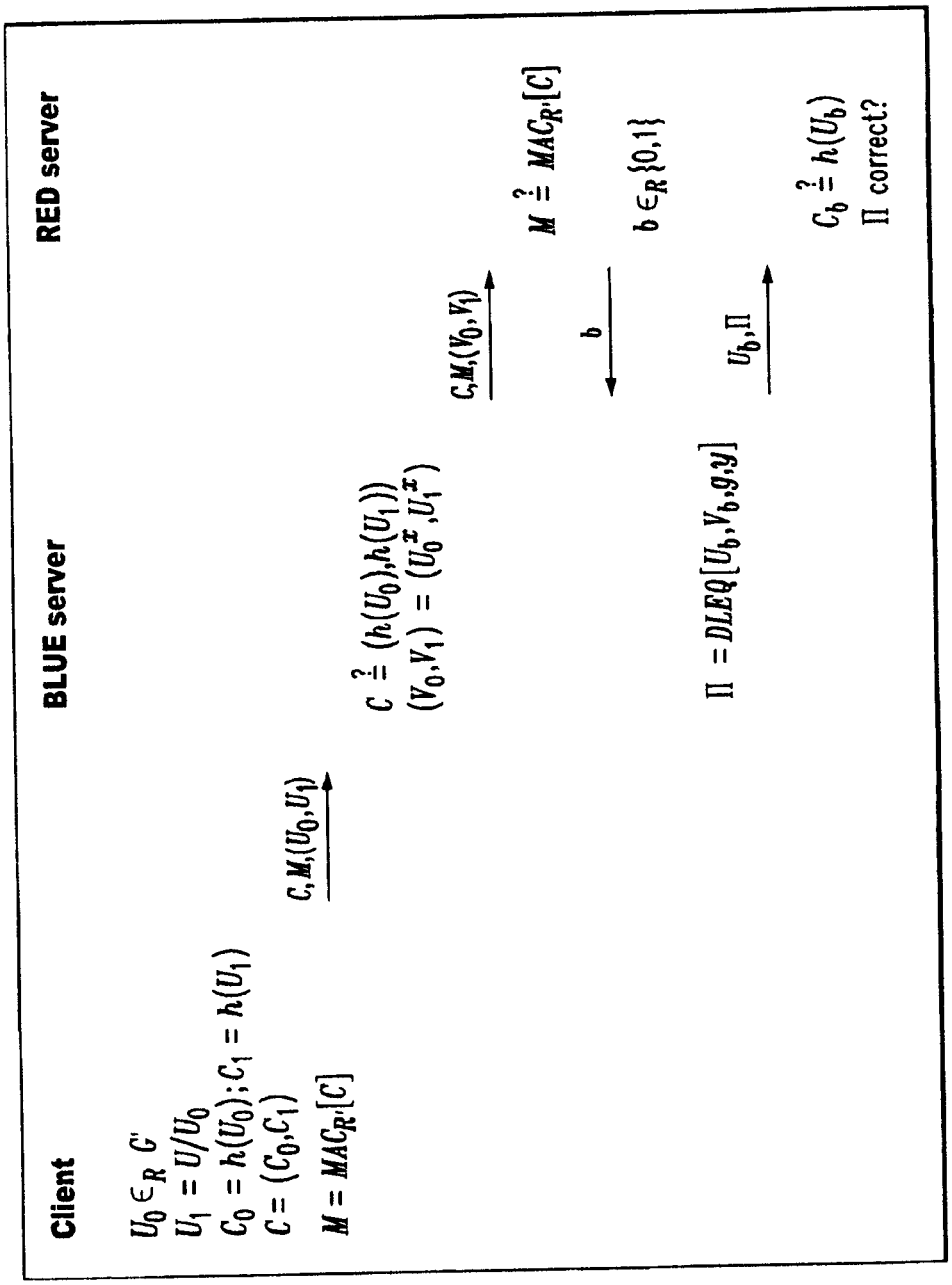
Figure 6:
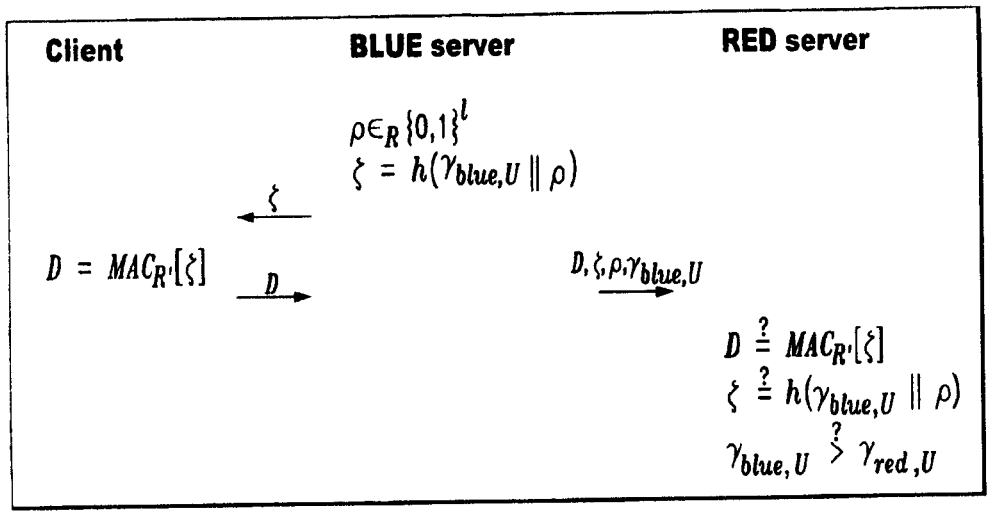
Figure 7:
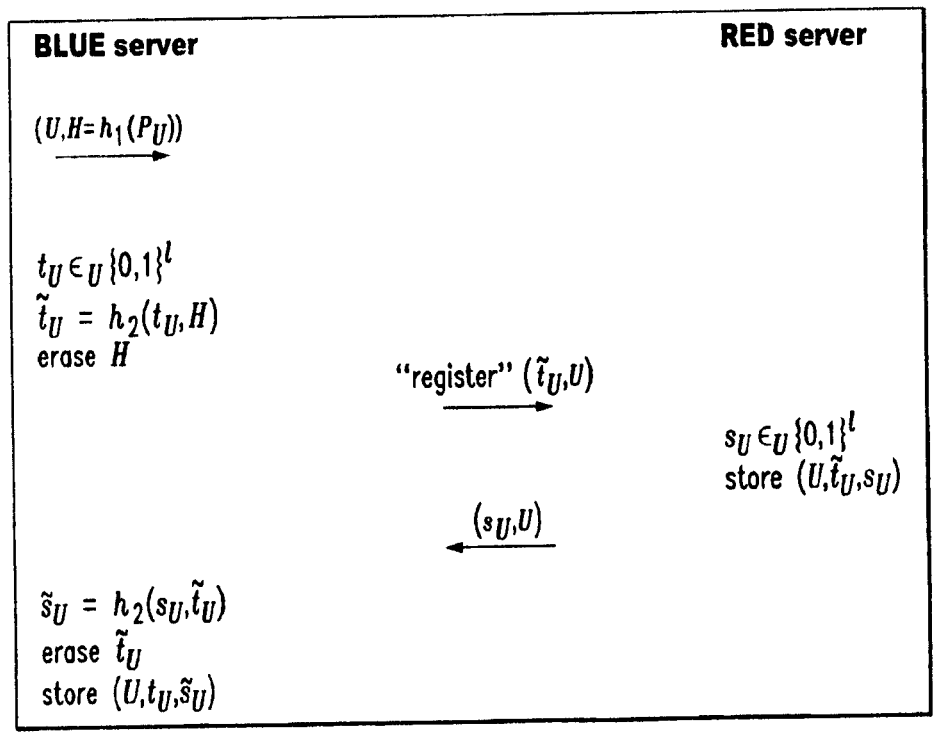
Figure 8:
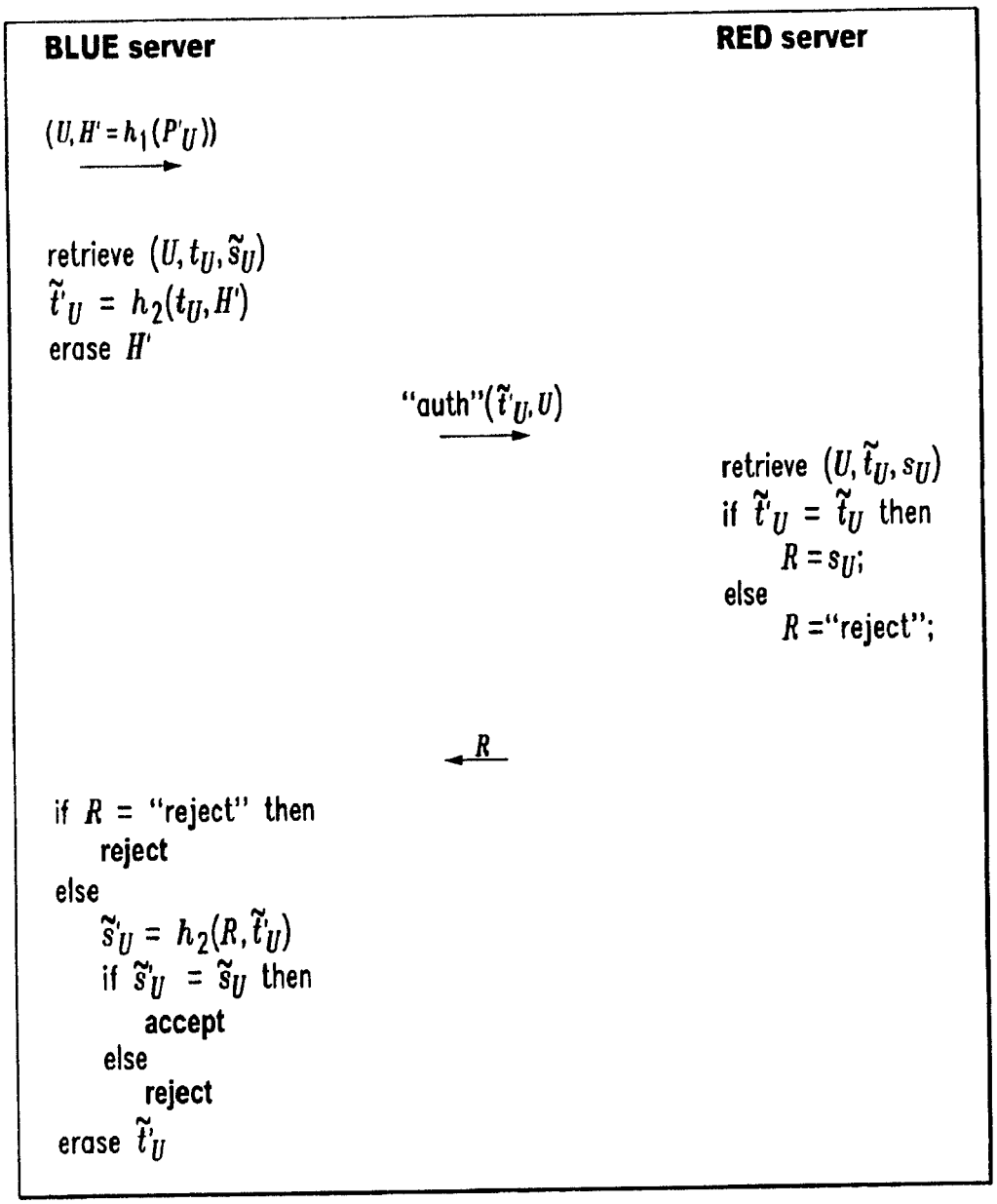
Figure 1:
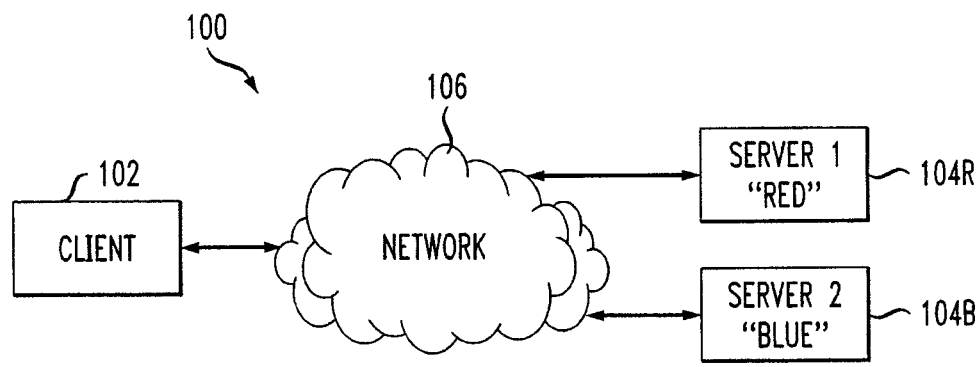
Figure 2:
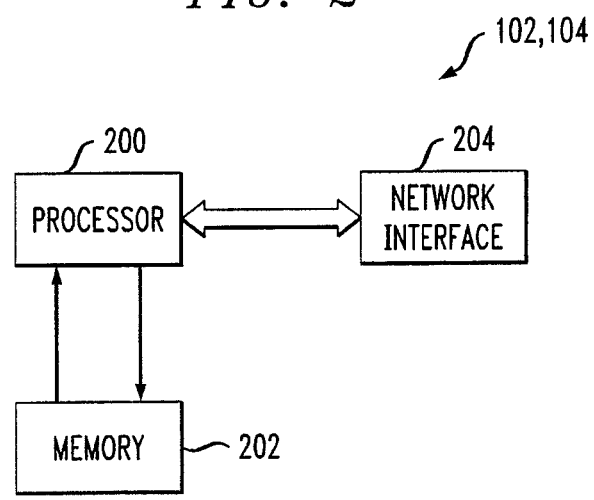
Figure 3:
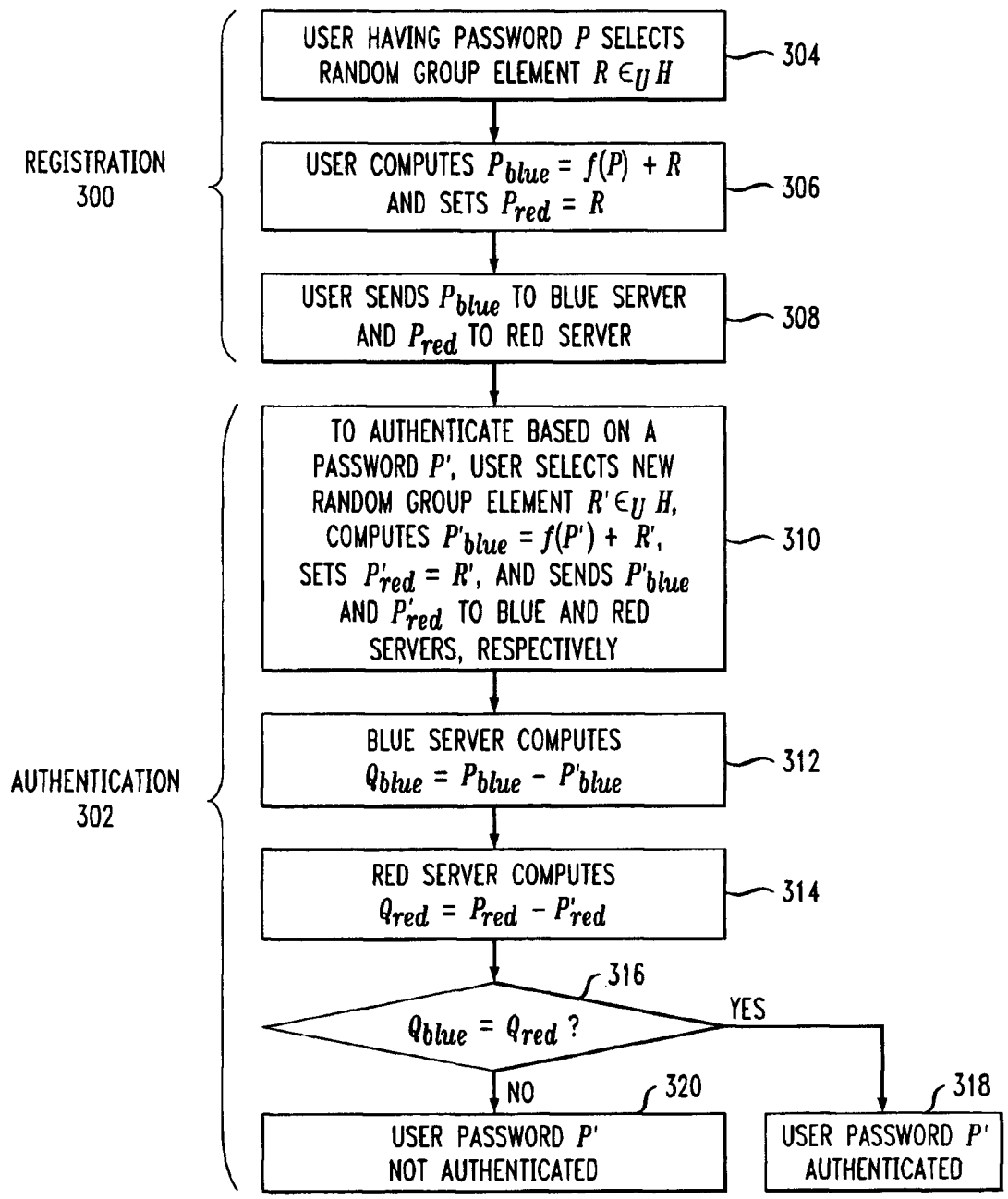
Figure 4:
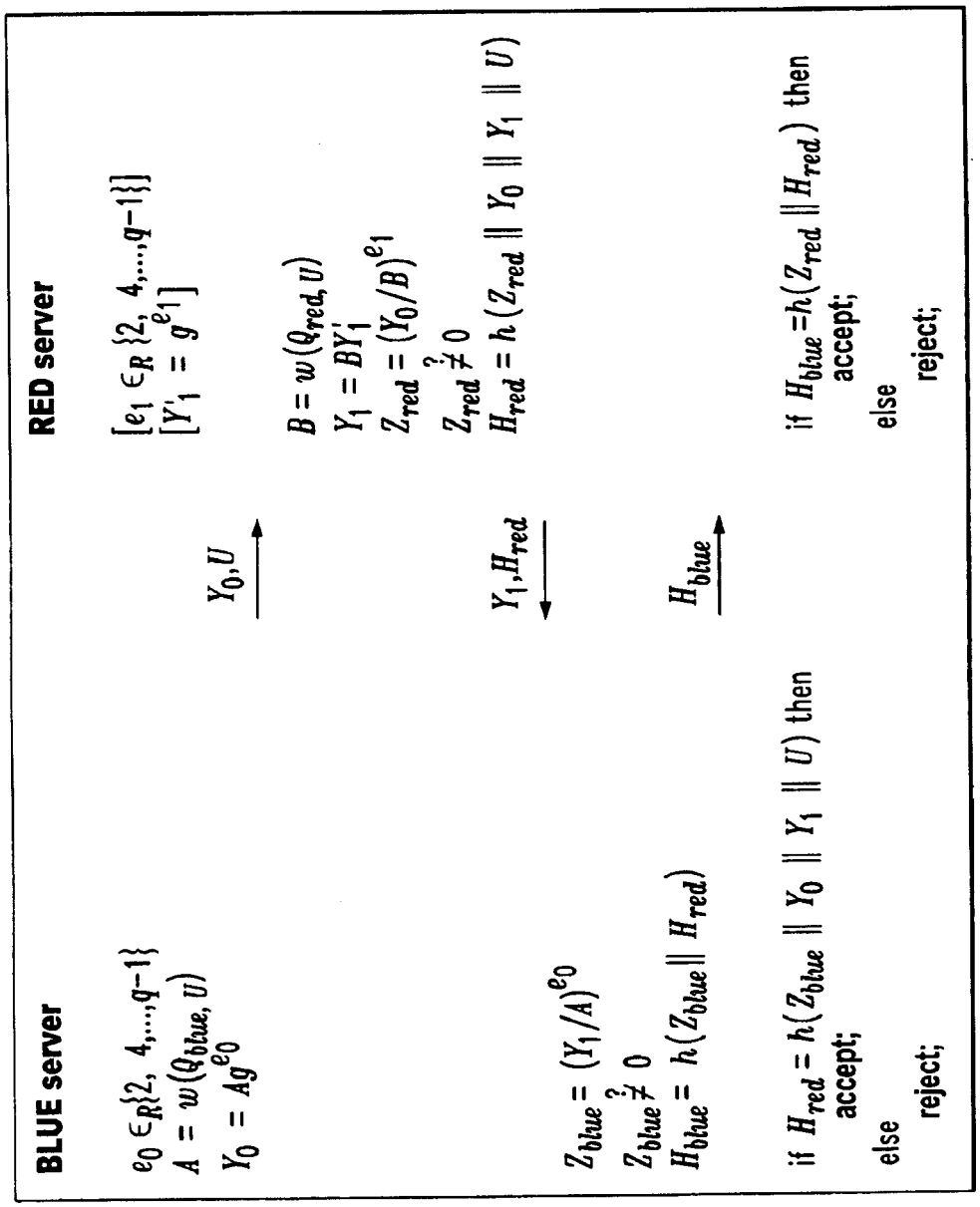
Figure 5:
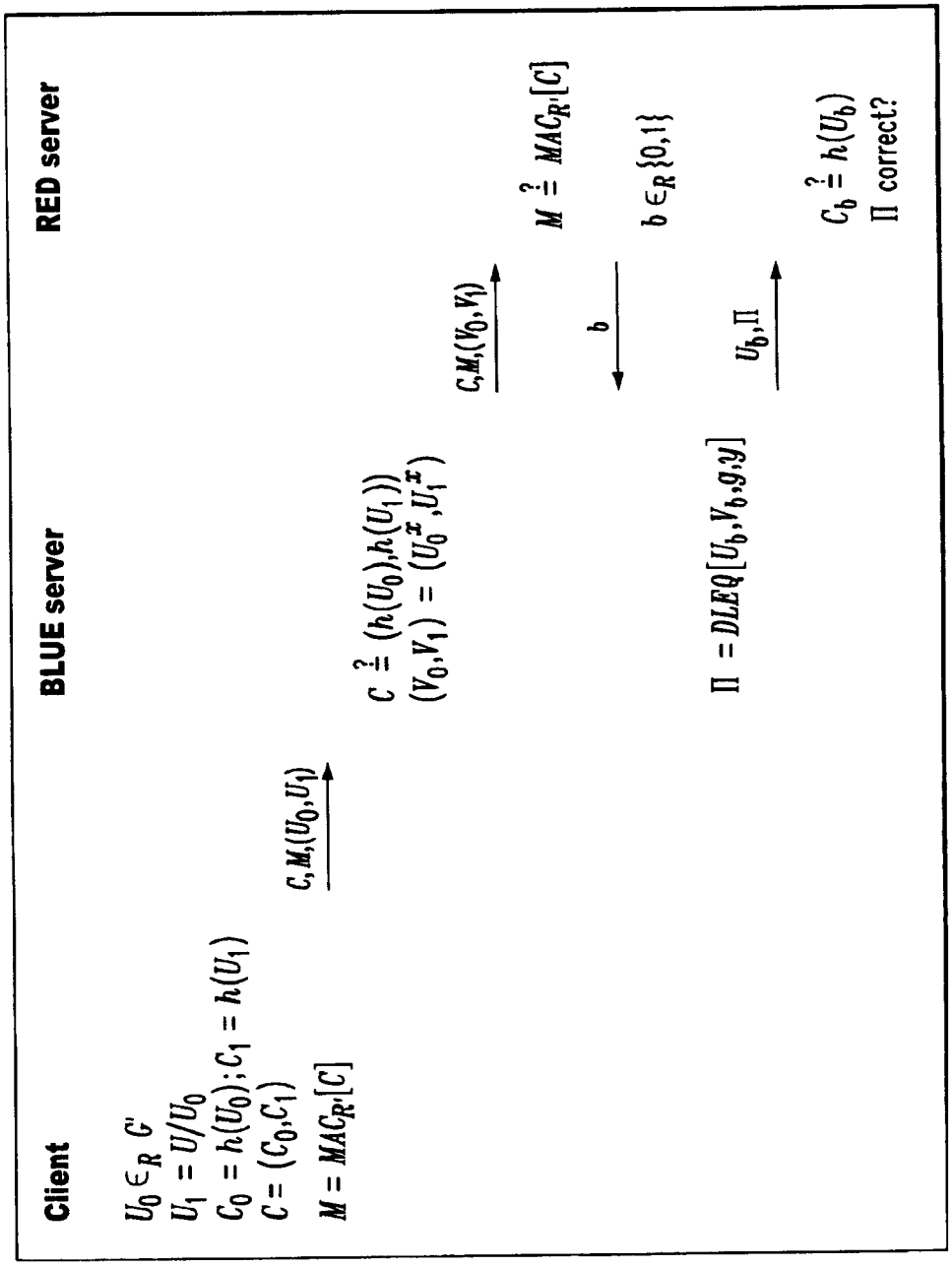
Figure 6:
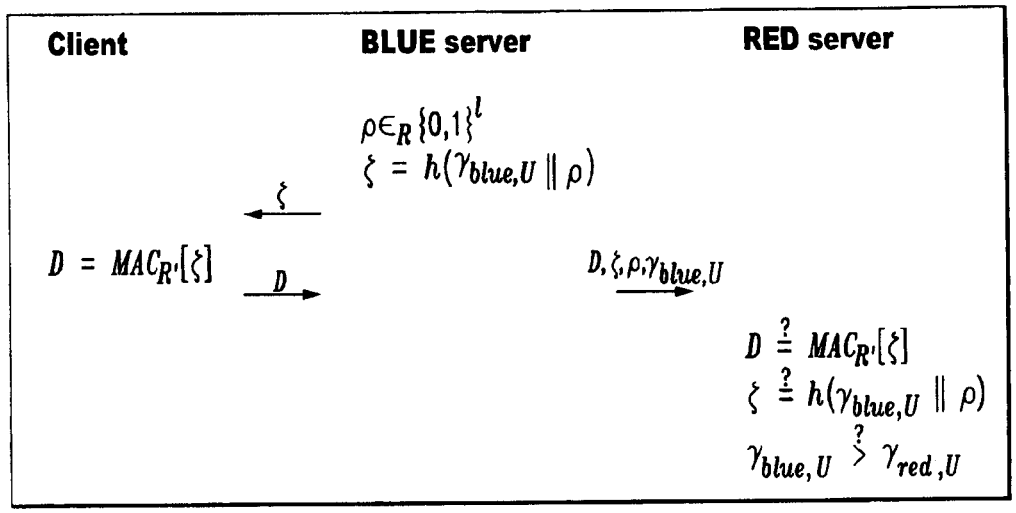
Figure 7:
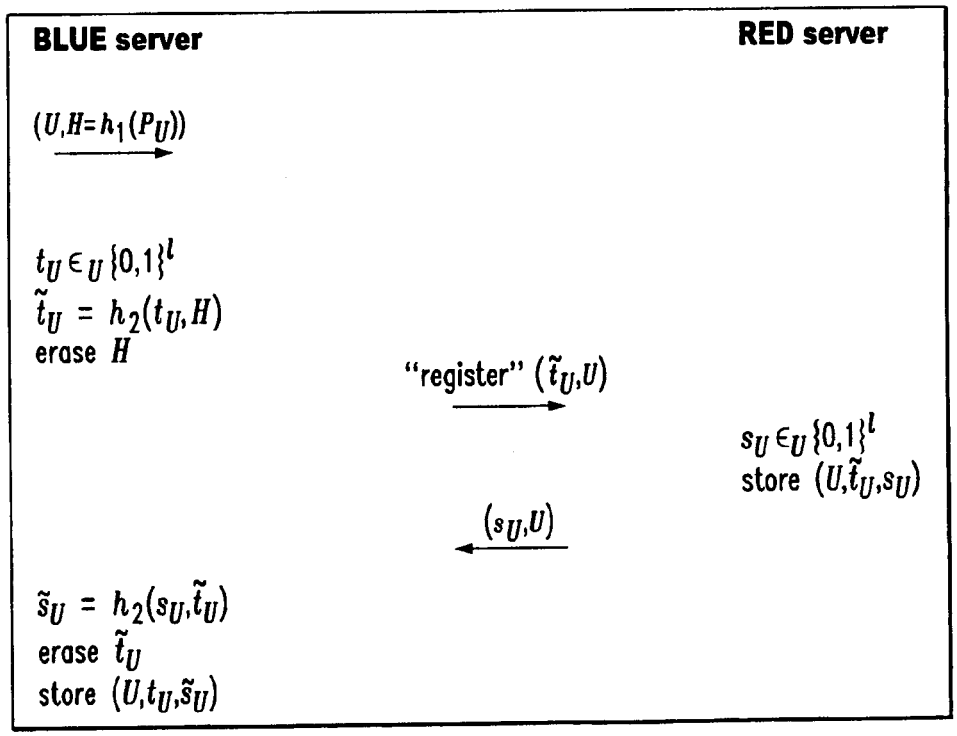
Figure 8:
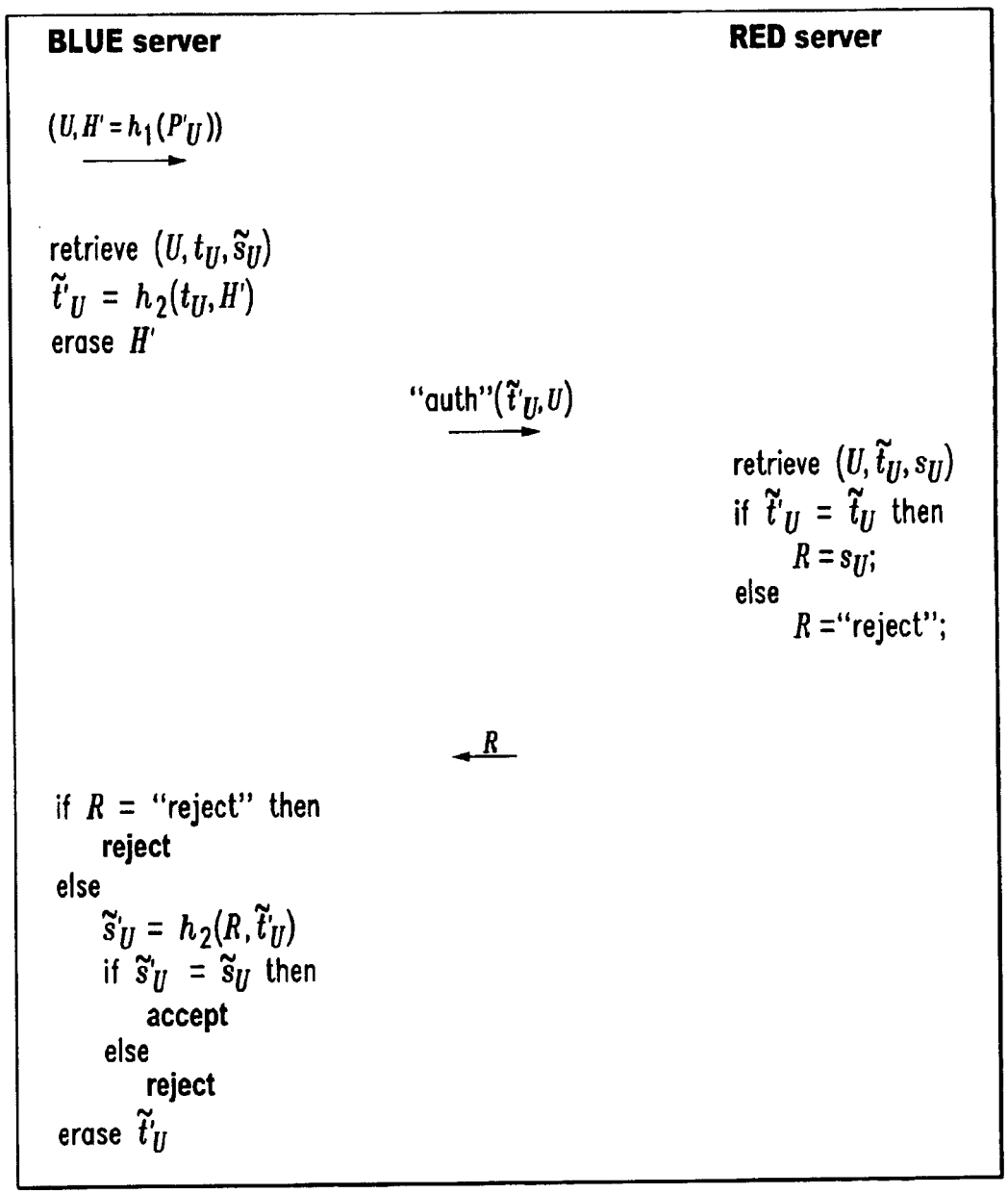

FIG. 8 shows the authentication portion of the poor-man's variant. In this figure, H' denotes the result of applying hash function $h_1$ to the password $P'_U$. Red is assumed to release a stored key ($s_U$) on receipt of a correct input key $t_U$, for a given account U. Otherwise Red sends a reject message. We assume that the aim of the poor-man's variant is to enable Blue alone to accept or reject a given authentication session. More advanced secure authentication protocols can be achieved by having Blue forward the pair ($s_U$, $t_U$) to the client, enabling the client to derive a key from the pair of values. This results in ephemeral exposure of $s_U$ to Blue. It does not, however, alter the basic security of the poor-man's variant, in that secrets are not stored in a persistent manner on Blue. Another extension is for Blue itself to reconstruct a key from the pair ($s_U$, $t_U$).

A variety of different realizations of this variant are possible. As one example, rather than transmitting the input key $\tilde{t}_U$ directly to Red, Blue may run an authentication protocol with Red to demonstrate that $\tilde{t}_U$ is correct. This protocol could be a standard password-based protocol for authenticating to Red, including a conventional SPAKA technique. Red would then grant Blue access to the stored key $s_U$ just as Red might grant access to other entities to other stored information upon successful authentication. Thus Red could, in principle, be implemented as a file server or similar network resource.

Red only needs to verify the input key $\tilde{t}_U$, and does not need to store it. Red could thus alternatively store a hashed version of $\tilde{t}_U$ using techniques similar to those used in conventional authentication protocols. Red might also verify the input key by playing the role of a client or of one of the servers in a second system of the type described herein.

As another example, the input key $\tilde{t}_U$ could be the private key of a public-key/private-key pair, derived from H' and $t_U$. Blue would then perform an operation with the private key to authenticate to Red, which would verify with the public key. In this case, the public key would be stored at Red rather than $\tilde{t}_U$, and the registration protocol in FIG. 7 would be modified accordingly.

Red and Blue may interact through a private channel, such as one established via SSL, or, depending on the authentication protocol, the value $\tilde{t}_U$ itself may provide for the establishment of the private channel.

When Blue authenticates to Red, Blue is not simply a proxy for the client, because Blue itself "hardens" the password first via combination with the stored $t_U$ value. If Blue were simply a proxy, authenticating on behalf of the client with the same password, then compromise of Red would enable the attacker to mount a dictionary attack on the password, as it would in standard password-based protocols. Here, the password remains private even if Red is compromised.

Multi-Server Variant

Variants with more than two servers may be configured to provide stronger security, such as a variant based on a k-out-of-n system employing standard techniques for polynomial secret sharing, as described in A. Shamir, "How to Share a Secret," Communications of the Association for Computing Machinery, 22(11):612-613, November 1979, which is incorporated by reference herein. Like the two-server protocol, however, these stronger variants still require little or no computationally intensive computation on the part of the client.

We now describe a variant of the FIG. 3 secure authentication protocol suitable for two or more servers, that is, for a general number n of servers, where $n \geq 2$. Of course, such multiple-server variants of the FIG. 3 protocol can be obtained straightforwardly by the use of redundant servers and simultaneous engagement of multiple, two-server protocols. This variant instead includes n servers and a threshold access structure such that users may authenticate successfully if at least k of the n servers are in operation.

The multi-server variant provides robustness against a limited number of simple server failures, that is, for situations in which all servers behave correctly, but may be subject to outages. This variant does not achieve robustness in the general case of Byzantine failures, that is, failures in which servers may behave maliciously, although the issue of Byzantine robustness will be addressed in further detail below.

In the multi-server variant, the client distributes a password among servers by means of standard polynomial secret sharing. A password P is registered by means of a random polynomial p whose zero point p(0) is equal to a representation of the password. The client authenticates by means of an independent, random polynomial p' representing claimed password P'. The task of the servers is to determine whether p(0)=p'(0), or equivalently, whether (p−p') (0)=0, without leaking any additional information. The servers accomplish this by exchanging blinded transformations of their individual shares. In other words, they exchange ciphertexts that hide the values of their shares, but still enable them to test the condition (p−p') (0)≟0

For clarity of presentation, the multi-server variant is assumed to use the field over $Z_q$ where q is a large prime, e.g., 160 bits in length, although it is possible to extend the variant to make use of other representations of the field $F_q$. Additionally, let h be a collision-intractable hash function $\{0, 1\}^* \to Z_q$. Let G be a group of order q with published generator g wherein the Decision Diffie-Hellman problem is hard. The term "broadcast" in the following description is used to indicate the transmission of a piece of data to all servers individually. We do not in fact require use of a true broadcast channel, which is an advantageous feature of this variant. Let $S_i$ denote the $i^{th}$ server, and let [i,j] denote the set of integers between i and j inclusive. Finally, let $\lambda_{o,j}$ denote the LaGrange coefficients for reconstruction of the free term in a (k−1)-degree polynomial over $Z_q$ given an evaluation of the polynomial at the integer j.

In the registration portion of the multi-server variant, password P is encoded as a random polynomial p over F of degree k−1 such that p(0)=h(P). For $1 \leq i \leq n$, the client sends the point p(i) to server $S_i$.

In the authentication portion, the client presents password P' by constructing a random polynomial p' of degree k−1 such that p'(0)=h(P'). For $1 \leq i \leq n$, the client sends point p'(i) to server $S_i$. Assume that the n servers decide on a set of k functioning servers, and a unique session identifier $ID_U$ for every login attempt by U. This may be achieved, e.g., by having servers keep a counter for each account and terminating in case of counter discrepancies. Without loss of generality, denote these $S_1, S_2, \ldots, S_k$. Let r denote the polynomial p−p'; we observe that each server $S_i$ can compute its own evaluation r(i)=p(i)−p'(i). The servers now perform the following steps. If, at any time, a server receives an incorrect decommitment from another server, it terminates and rejects.

1. Each server $S_i$ selects a random blinding factor $b_i \in_U Z_q$.
2. Each server $S_i$ computes $\mu_i = g^{r(i)b_i}$, and broadcasts the commitment $C_i = C(\mu_i, U, ID_U)$.
3. On receipt of the full set of commitments $$\{C_i\}_{i=1}^k,$$

each server $S_i$ broadcasts $\mu_i = \mu_i^{(I)}$.

4. For j=2 to k:
   a. Each server $S_i$ computes d=i+(j−1) mod k and $$\mu_d^{(j)} \leftarrow (\mu_d^{(j-1)})^{b_i}.$$

b. Each server $S_i$ broadcasts $C_{i,j} = C(\mu_d^{(j)}, U, ID_U, i, j)$
   c. On receipt of the full set of commitments $$\{C_{i,j}\}_{i=1}^k,$$

each server $S_i$ broadcasts $\mu_d^{(j)}$.
   d. Each server $S_i$ checks that the decommitment $\mu_d^{(j)} \in G - \{1\}$ for all d.

5. Server $S_i$ computes $$w_i = \prod_{j=1}^{k} (\mu_j^{(k)})^{\lambda_{0,j}}.$$

6. If $w_i=1$, then server $S_i$ concludes that $r(0)=0$, and accepts. Otherwise it rejects.

Observe that in this multi-server variant, as in the two-server protocol of FIG. 3, the client need perform no computationally intensive cryptographic operations for either registration or authentication. It can be shown that security for this variant is reducible to the Diffie-Hellman assumption over G and the collision intractability of the hash function h. It is important to note, however, that security is limited in this variant in the sense that an adversary can easily mount a denial-of-service attack. Indeed, a malicious adversary can cause false rejection of an authentication attempt simply by furnishing incorrect blinded share values.

It is possible to avoid the problem of Byzantine failures most straightforwardly by checking all possible subsets of k shares in an exhaustive fashion until either a successful subset is found or complete failure is achieved. This approach runs the risk of permitting an attacker effectively to make multiple password guesses, each instantiated by a different combination of k shares. We can avoid this problem by permitting valid passwords to occupy only small, random subset of G, e.g., by mapping passwords into G using a hash function whose range constitutes a small subset of G. This approach is wholly impractical when there are many servers. It is somewhat feasible, however, when there are only a few servers. Moreover, an auditor, by posing as a client, can use this approach to identify and eliminate cheating servers.

Alternative Multi-Server Variant with Byzantine Robustness

We will now describe a multi-server protocol variant with unanalyzed security that permits a client to submit a verifiably correct El Gamal ciphertext on his or her password using no computationally intensive cryptography. The idea is to define polynomials over the ring ZN for RSA modulus N, rather than a field. This ring is nearly a field, however, in the sense that an overwhelming proportion of elements in $Z^*_N$ have multiplicative inverses. The client computes a set of commitments $C=\{(p(i))^2 \bmod N\}$ to points on p, and sends this to all servers; the client also sends the individual point p(i) to server $S_i$. The servers decide on a consistent version of C, if one exists, by majority vote.

In this system, El Gamal ciphertexts are produced over an underlying group of order N, the same order as the ring over which polynomials are constructed. In particular, the servers work with El Gamal ciphertexts over a group G that consists of the subgroup of $Z_{N^2}$ with order N. A generator for this subgroup is g=1+N. This is known to those skilled in the art as the setup for the Paillier cryptosystem, as described in P. Paillier, "Public-Key Cryptosystems Based on Composite Degree Residuosity Classes," EUROCRYPT '99, LNCS No. 1592, J. Stern, editor, pp. 223-238, 1999, which is incorporated by reference herein. Each server posts an El Gamal ciphertext $E[g^{p(i)}]$ and proves its correctness in non-interactive zero-knowledge proof relative to $(p(i))^2 \bmod N$, as provided in C.

Such proofs may be constructed with straightforward use of well-known techniques such as those described in R. Cramer et al., "Proofs of Partial Knowledge and Simplified Design of Witness Hiding Protocols," CRYPTO '94, LNCS No. 839, Y. G. Desmedt, editor, pp. 174-187, Springer-Verlag, 1994, and A. de Santis et al., "On Monotone Formula Closure of SZK," FOCS '94, IEEE Press, pp. 454-465, 1994, both of which are incorporated by reference herein. To achieve practical efficiency, however, it may be necessary to use variants such as those described in E. Fujisaki and T. Okamoto, "Statistical Zero Knowledge Protocols to Prove Modular Polynomial Relations," CRYPTO '97, LNCS No. 1294, B. Kaliski, editor, Springer-Verlag, pp. 16-30, 1997, and I. Damgard and E. Fujisaki, "An Integer Commitment Scheme Based on Groups with Hidden Order," IACR eArchive, 2001, both of which are incorporated by reference herein. These variants function over groups of unknown order, e.g., the subgroup of $Z_{N'}$ for an RSA modulus N', and require additional invocation of the Strong RSA Assumption. Once shares have been posted and verified, servers can check the submitted El Gamal ciphertext against the registered El Gamal ciphertext on the user's password. This can be done securely using, e.g., the above-noted PET protocol. The result is a protocol variant with full Byzantine robustness.

The security of this protocol variant depends upon the ability of the commitment $(p(i))^2 \bmod N$ to hide sufficient information about p(i). Although the security of this variant has not been analyzed in detail, we believe that it may be reducible to the Strong RSA Assumption and the Decision Diffie-Hellman assumption over G.

A number of example applications of the secure authentication protocols of the present invention will now be described. The following description will refer primarily to the two-server protocol of FIG. 3 for simplicity and clarity of illustration, although the applications are also generally applicable to the poor-man's and multi-server variants, as well as other variants. The example applications to be described are roaming credentials, proxy signatures, signed assertions, life questions, private information splitting, privacy-preserving data mining, and two-seed RSA SecurID® authentication.

Roaming Credentials

Like the Ford and Kaliski system described previously, the secure authentication protocols of the present invention can be adapted to enable a roaming user to download credentials with enhanced security. With reference to the FIG. 3 protocol, one can distribute the private key $\sigma_U$ across Blue and Red in the form of two shares $$\sigma_U^{(blue)} \text{ and } \sigma_U^{(red)}.$$

(The private key could either be generated first then split into shares, or the shares could be generated first and the private key derived therefrom.) When the user authenticates successfully, the two servers then release their shares to the user.

In an arrangement in which Red serves as a back-end server, Red can encrypt $$\sigma_U^{(red)}$$

under R' or a key derived therefrom, where as noted above R' is the share provided by the client for the purpose of authentication.

More generally, the private key or credentials can be encrypted with a key stored on one server, where the result of encryption is stored on the other server. Upon successful authentication, one server would return the encryption key to the client, and the other server would return the encrypted credentials.

Proxy Signatures

An alternative approach of the above is possible in which each server uses its share of a user's credential to perform a cryptographic operation on behalf of the user. For example, $$\sigma_U^{(blue)} \text{ and } \sigma_U^{(red)}$$

above might each be a share of an RSA signing key. Using standard threshold techniques, Red and Blue could, on successful authentication by the user, produce a digital signature using the private key of the user as a "proxy" of the user. Here, the user would submit a message to be signed to the servers (with appropriate integrity protection, as provided by the now-authenticated channels to the servers). Other forms of cryptographic service delegation are also possible, of course, such as decryption.

If the equality-testing protocol succeeds, both servers obtain assurance that the other has successfully authenticated the user. In principle, either one of the servers could thereafter act alone as a proxy of the user, with the assurance that the user has been authenticated by both servers. For instance, either server alone could produce a digital signature on behalf of the user. This might be done by reconstructing the user's private key from the shares $$\sigma_U^{(blue)} \text{ and } \sigma_U^{(red)}$$

at one of the servers rather than at the client. In this way, the private key would be exposed only temporarily at one of the servers, and not at the client. The approach based on threshold techniques has the further advantage that the private key is not exposed even temporarily.

Signed Assertions

As a further variation of the above digital signature approach, Red and Blue could produce a signature jointly not with a key associated with the user, but rather with a key representing the two servers. The signature could serve to indicate the successful authentication by the user to other relying parties, for instance as specified in the Security Assertion Markup Language (SAML). This is a helpful enhancement to an authentication service since there is now no single point of compromise either for authentication information about users or for issuing signed assertions. Of course, as noted above, another configuration involves only one server issuing the signed assertion upon successful authentication of the user by both.

Life Questions

As noted above, many service providers today require users on registering to furnish answers to a set of life questions, that is, personal questions about the user. An example of such a question might be "What high school did you attend?" To recover a lost password, the user again provides answers to these questions. The service provider verifies the full batch of provided answers. If the user responds with enough correct answers, say, three out of five, the service provider will release the forgotten password or PIN or permit the user to reset it.

The secure authentication protocols of the present invention can be used to protect the answers to personal questions of this kind by, for example, treating them as individual passwords. Such a variant, however, may require an additional design feature. To prevent guessing attempts against individual life questions, the system should throttle attempts with respect to the entire set of questions. This is to say that all of the answers to the questions should together be regarded as belonging to a single account, and verified simultaneously or counted collectively in policy decisions. For instance, the protocol values corresponding to answers to different life questions may be transmitted to Blue and Red as a set and processed in parallel, with the final decision depending on the success of the protocol for each value (perhaps with some threshold). The entire account should be locked on the basis of the number of failed authentication attempts, where success or failure is a system policy applied to the total question set.

In practice, only one server might manage the user's password, for instance the Blue server. The user would authenticate to both via life questions, and upon successful authentication, one server would authorize the user to reset his or her password.

It is also possible to group life questions according to themes. In particular, the system may be configured such that a user can select from among a set of themes, each of which comprises a set of questions unified by the theme. For example, a "Rock-and-Roll" theme may include questions about rock bands. Such theme-based questions are intended to be included within the term "life questions" as used herein.

Private Information Splitting

Credentials are not the only form of private information that may be conveniently split across Red and Blue. In a life questions system, for example, it is convenient to remind successfully authenticated users of the answers to any incorrectly answered questions. Since these answers are already split across the two servers, their associated shares may be downloaded to the client and reassembled for display. Other private user information such as credit card information, address information, and so forth may be similarly protected through sharing across the two servers and reassembled on the client or either server as appropriate. Alternatively, for clients wishing to transmit this information to a third party, e.g., credit card information to a merchant, the user information may be assembled remotely on successful user authentication.

One way to view this extension is to consider that Red can store two keys, one that is released to Blue, and another that is released to the client. In this way, Blue can store information such as credit card numbers and user profiles that is only decrypted after the user has successfully authenticated. If the information is protected with the key released to Blue, then Blue can decrypt the information locally. If the information is protected with the key released to the client, then the client can decrypt the information.

If the answer to a life question, or some other secret, does not need to be reconstructed, then a one-way function of the value, rather than the value itself, may be split, as described previously.

Privacy-Preserving Data Mining

Given private information shared across the two servers for many users, it is possible to blind information in such a way as to render it suitable for anonymous data mining. Suppose that a piece of user data $\delta$ is shared multiplicatively, over some appropriate group, with share $\delta_{red}$ held by Red and share $\delta_{blue}$ held by Blue such that $\delta=\delta_{red}\delta_{blue}$. Let y be an El Gamal public key whose corresponding private key is shared between the two servers, and g be a generator for the underlying group. Suppose that Red constructs ciphertext $(\alpha_0, \beta_0) = (\delta_{red} y^{k_\alpha}, g^{k_0})$ on $\delta_{red}$ using random encryption factor $k_0$, while Blue constructs an analogous ciphertext $(\alpha_1, \beta_1)$ on $\beta_{blue}$. Observe that the ciphertext $(\alpha, \beta)=(\alpha_0\alpha_1, \beta_0\beta_1)$ has corresponding plaintext $\delta$, due to the multiplicative homomorphism of El Gamal.

After constructing a list of such ciphertexts, Red and Blue can then act as a two-server decryption mix network of a type described in D. Chaum, "Untraceable Electronic Mail, Return Addresses, and Digital Pseudonyms," Communications of the ACM, 24(2):84-88, 1981, which is incorporated by reference herein. A decryption mix is a construction in which a collection of servers take as input a list of ciphertexts and output the corresponding plaintexts re-ordered according to a secret, random permutation. The special security property of a mix network is the fact that the permutation cannot be determined by an adversary that does not control a majority of the servers. Thus the resulting output will comprise all of the plaintexts, i.e., the private information of users, but in a fully anonymized form such that no individual piece of information can be tied to its owner by either Red or Blue alone. This information can be used to compile useful, anonymized statistics on a user population for, e.g., provision to a third party or to perform privacy-preserving targeted advertising such as that described in A. Juels, "Targeted Advertising . . . and Privacy Too," RSA-CT '01, LNCS No. 2020, D. Naccache, editor, pp. 408-424, 2001, which is incorporated by reference herein.

The idea of profile anonymizing can be extended straightforwardly to the multiple-server case, to use of other asymmetric cryptosystems such as RSA, and also to scenarios in which the client itself directly prepares ciphertexts for mixing. In the two-server setting, a simplification is possible where Red provides anonymized information directly to Blue. In this case, it is possible for Red to act as a one-server decryption mix, i.e., to send a random permutation of the reencrypted ciphertexts to Blue, along with a decryption share for Red for each ciphertext. Blue can then complete the decryption of ciphertexts itself.

The strongest security on either the one-server or two-server mix network is achievable using a construction that enforces correctness. In such a mix network, each participating server provides a proof that it performed the mixing operation correctly, and also a proof that it contributed a correct decryption share. Often, however, the incentive for a server to behave incorrectly during the mixing process is small. In such cases, it is possible to omit the proofs of correct behavior. This renders the scheme more efficient, but means that the mix is resistant to attack in the strongest sense only against passive compromise of less than a majority of the servers.

Another property of mix networks useful in the case where there are more than two servers, as in our multiple-server authentication variant, is that of robustness. This is the property according to which the mix network functions even if a minority of servers fails in some way.

Examples of recent mix network constructions providing correctness and robustness for mixing of El Gamal ciphertexts are described in J. Furukawa and K. Sako, "An Efficient Scheme for Proving a Shuffle," CRYPTO '01, LNCS No. 2139, Springer-Verlag, pp. 368-387, 2001, and A. Neff, "A Verifiable Secret Shuffle and its Application to E-voting," ACM CCS '01, ACM Press, pp. 116-125, 2001, both of which are incorporated by reference herein.

In some cases, a piece of information in a user profile may be too lengthy to admit of encoding in a single asymmetric ciphertext of standard length, e.g., 1024 bits. While such information can be encoded across multiple asymmetric ciphertexts, this may lead to rather inefficient assembly of ciphertexts and inefficient mixing as well. To circumvent this difficulty, we can employ what is known as a hybrid mix network. This term refers broadly to a mix network combining symmetric and asymmetric cryptography so as to enable efficient mixing of long input ciphertexts.

For example, the original proposal of the above-cited D. Chaum reference may be viewed as a hybrid mix network, and can be adapted for use with the present invention as follows. Let m be a piece of user profile information to be passed through the mix network. For a two-server mix involving both Red and Blue, the client can provide the ciphertext $c=E_{PK_{red}}[E_{PK_{blue}}[m]]$, where $E_{PK}$ denotes encryption under the public key $PK_i$ using enveloping, e.g., standard public key encryption for long plaintexts. To perform the mixing operation, Red decrypts the outer layer of each input ciphertext, randomly permutes the resulting list of ciphertexts, and passes this to Blue. Blue performs the analogous operation, randomly permuting and outputting the resulting plaintexts. For a hybrid mix involving just Red, it is sufficient for the client to prepare a ciphertext $c=E_{PK_{red}}[m]$ to be transmitted to Red.

In the case where security properties such as correctness and/or robustness are desired, clients can prepare ciphertexts appropriate for a hybrid mix providing the appropriate properties, such as those described in M. Ohkubo and M. Abe, "A Length-Invariant Hybrid Mix," ASIACRYPT '00, LNCS No. 1976, T. Okamoto, editor, pp. 178-191, 2000, and M. Jakobsson and A. Juels, "An Optimally Robust Hybrid Mix Network," Principles of Distributed Computing (PODC) '01, ACM Press, pp. 284-292, 2001, both of which are incorporated by reference herein.

It should be noted that the + operation used for sharing of password in the authentication portion of the FIG. 3 protocol can in fact be instantiated with modular multiplication on H, rather than, e.g., an XOR operator. In this case, H is the multiplicative group used for El Gamal encryption and mixing. In this way, the processes of password sharing across servers and sharing of other private information for mixing can be harmonized.

Two-Seed RSA SecurID®

An RSA SecurID® is a hardware-based user authentication token commercially available from RSA Security Inc. of Bedford, Mass., U.S.A. It functions by means of a unique secret σ shared by the token and an authenticating server. The unique secret σ is also referred to as a "seed." The token operates essentially as follows. Every minute, the token displays a passcode comprising a new sequence of digits computed by providing σ and the current time t (with one-minute granularity) to a pseudorandom generator $f$, yielding output $f(σ, t)$. To authenticate, a user types this passcode into a client, which transmits it to the authenticating server for verification. In this system, compromise of the authenticating server may result in a system compromise.

Using the techniques of the present invention, however, it is possible to construct a two-server or multiple-server variant on the RSA SecurID® system or similar dynamic authentication method wherein the password varies as a function of a secret seed and the time or other changing value. Suppose that instead of containing one seed σ, the token for user U contains two seeds, $σ_{red}$ and $σ_{blue}$. The token displays $P'=f(σ_{red}, t)+f(σ_{blue}, t)$. Here, as above, all arithmetic takes place over an appropriate algebraic group. The client splits P' randomly into shares $$P'_{red} \text{ and } P'_{blue}$$

such that P'=

$$P' = P'_{red} + P'_{blue}.$$

Now, Red can compute $P_{red}=f(σ_{red}, t)$ and Blue can likewise compute $P_{blue}=f(σ_{blue}, t)$. To check the correctness of the shares provided by the user, the two servers may now use the equality-testing protocol of FIG. 4 to check equality of the value $$Q_{red} = P_{red} + P'_{red}$$

as computed by Red and the analogous value $Q_{blue}$ computed by Blue. In this system, an attacker that compromises one of the two servers is still unable to authenticate successfully. We note that users may also employ PINs in the RSA SecurID® system. These may be split the same way as passwords, using the techniques described above. If both the PINs and the seeds are split between two servers, then compromise of one server is insufficient to obtain even one "factor" of the user's authentication credentials, which is an advantage over the more direct approach where the PINs are stored on one server, and the seeds on another.

Applications to Other Roaming Protocols

The applications above are also generally applicable to other roaming protocols involving two or more servers. For instance, they may be applied to the Ford-Kaliski protocol. In that protocol, a client obtains a strong secret from a weak secret such as a password through interaction with two or more servers. The strong secret may then be applied to decrypt credentials and to authenticate to the servers.

The authentication at one or more servers occurs after the client has obtained the strong secret in the Ford-Kaliski protocol, and no further services are provided to the user by that server (other than local record-keeping). However, in the various applications described above, further services are provided to the user after the authentication at the servers. These same services may be applied in the Ford-Kaliski protocol.

More specifically, after authentication by the user to the servers in the Ford-Kaliski protocol, the servers may (a) provide shares of a credential to a user; (b) compute a digital signature or perform some other cryptographic operation on behalf of the user (at one server, or via threshold techniques involving more than one server); (c) issue a signed assertion of the successful authentication (e.g., a SAML assertion); (d) reset a password, based on the user's provision of correct answers to life questions; and/or (e) provide shares of private information to the client, to one another, and/or to another party. Privacy-preserving data mining is also generally applicable in a context involving two servers and may be performed separately from the process of authentication.

We now describe a number of example protocol extensions designed to increase system security and reliability. These extensions are proactive security and security against denial-of-service attacks. Again, although described primarily in the context of the two-server protocol of FIG. 3, the extensions are also applicable to other variants and roaming protocols.

Proactive Security

Proactive security refers generally to security against compromise of both servers at different times. The idea is to perform a periodic re-randomization of the information sharing across servers. Let $P_{red}$ and $P_{blue}$ denote the additive shares of password P across Red and Blue. One possible re-randomization procedure for a given password P is as follows:

1. One of the servers, e.g., Blue, selects $ρ∈_R H$, and transmits ρ to Red.
2. Red updates $P_{red}$ as $P_{red}+ρ$.
3. Blue updates $P_{blue}$ as $P_{blue}-ρ$.

Now consider an attacker that achieves passive compromise of Red only prior to the rerandomization procedure, and achieves passive compromise of Blue only subsequent to the rerandomization. Such an attacker will learn $P_{red}$ and $P_{blue}-ρ$. As ρ is random value independent of the shares of P, however, no information is revealed to the attacker about P itself. The same idea applies when the adversary obtains active control of each server for a limited period of time, provided that all code and data are restored subsequent to the attack.

There remains, however, the additional problem of protecting the value p in transmission. Suppose Blue transmits ρ over a private channel under a public key $PK_{red}$ belonging to Red. An attacker that has compromised Red in a passive fashion will have learned the corresponding private key $SK_{red}$. Thus, the attacker will be able to decrypt communications between the two servers during the re-randomization, even if it does not have control of either server. This will result in compromise of ρ and undermine the proactive security property.

In consequence, another important requirement in achieving proactive security is for the servers (or Red, at least) to update their public keys on a regular basis. This may be accomplished, for example, through regular registration of new certificates with a certification authority (CA). Provided that the attacker does not control servers at the time that they register new public keys or during the re-randomization procedure, then we achieve the desired property of proactive security. Red and Blue can also use mechanisms other than certificate refreshes, such as out-of-band symmetric key distribution, in order to achieve forward secrecy on their shared channel.

Security Against Denial-of-Service Attacks

Certain of the secure authentication protocols of the invention can impose a moderately high computational burden on servers, particularly the life-question variant. Thus, another security issue to be considered is that of denial-of-service attacks. An attacker may seek to cause service to be denied to honest users through a combination of guessing attacks against legitimate accounts, resulting in account lockdowns and perhaps some account compromise, and rapid submission of authentication requests, yielding an unsustainable computational burden on the servers. We now describe several approaches to dealing with these kinds of denial-of-service attacks.

One approach to forestalling denial-of-service attacks is to identify the source of a presumed attack by means of IP tracing and to throttle service to suspect IP addresses. For example, a mechanism to facilitate reliable IP tracing is provided by Syncookies, as described at D. J. Bernstein, http://cr.yp.to/syncookies.html, 2002, which is incorporated by reference herein, and is now a standard part of current Linux and FreeBSD operating systems. IP tracing can be of limited utility in some cases, however, as attackers may seek to mount attacks via multiple IP addresses or through IP addresses shared with large bases of honest users.

Another approach to throttling denial-of-service attacks is to impose a resource charge on authenticating clients when an attack is detected. For example, in the "client puzzle" approach described in A. Juels and J. Brainard, "Client Puzzles: A Cryptographic Countermeasure Against Connection Depletion Attacks," Networks and Distributed System Security, S. Kent, editor, pp. 151-165, 1999, which is incorporated by reference herein, clients are required to submit correct solutions to moderately hard cryptographic "puzzles" in order to gain service. This has the effect of requiring an attacker to amass considerable computational resources in order to mount an attack. Client puzzles are therefore of very limited utility against an attacker mounting a large-scale distributed denial-of-service attack.

In an alternative, allied approach, the resource required of clients might be that of active human participation in the authentication process. This approach has been adopted by a number of Web sites, which require users to solve problems based on optical character recognition (OCR) within a certain time limit in order to obtain service. These problems are believed to be effectively insoluble by computers, but relatively easy for human beings. For an example, see the URL submission service on Altavista, http://addurl.altavista.com/sites/addurl/newurl.

An alternative to locking down a given account after a number of unsuccessful login attempts is to deny authentication requests to that account for a certain period of time. This may have the effect of slowing a guessing attack on the part of an attacker with knowledge of only a small set of account identifiers. An attacker with a list of many account identifiers, however, can simply sweep through this list, attacking a given account until a delay is imposed, and then moving to a new one.

Denial-of-service attacks involving account lockdowns can be aggravated by erroneous login attempts by honest users. In particular, such honest users will unintentionally increment counts of failed authentication attempts. In systems that register the total number of failures against individual accounts over time, this may result in hastened lockdown of accounts. A partial solution to this problem is offered by the "apology" mechanism described in D. P. Jablon, "Password Authentication Using Multiple Servers," Topics in Cryptology—CT-RSA 2001, LNCS No. 2020, D. Naccache, editor, Springer-Verlag, pp. 344-360, 2001, which is incorporated by reference herein. This proposal is as follows. On authenticating successfully, a user can acknowledge his or her previous erroneous attempts, thereby removing these from the record of failed attempts against the corresponding user account.

It should again be emphasized that the particular secure authentication techniques described above are provided by way of illustration, and should not be construed as limiting the present invention to any specific embodiment or group of embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for authenticating information in a system comprising a plurality of processing devices each adaptable for communication with one or more other devices of the plurality of devices, the method comprising the steps of:
generating at least first and second shares of a first password associated with a first device of the plurality of devices;
storing the first and second shares in respective second and third devices of the plurality of devices; and
upon submission of additional information associated with the first device to at least one of the second and third devices, each of the first and second shares having a property that it is infeasible to determine solely therefrom correspondence of the additional information with the first password, the second and third devices utilizing the respective first and second shares to collectively determine said correspondence of the additional information with the first password;
wherein the additional information comprises a third share and a fourth share, the third share being delivered by the first device to the second device, the fourth share being delivered by the first device to the third device.

2. The method of claim 1 wherein the first device comprises a client device and wherein the second and third devices comprise respective first and second servers connectable to the client device over a network.

3. The method of claim 2 wherein the generating step is implemented in the client device and the first and second shares are supplied by the client device to the respective first and second servers for storage therein.

4. The method of claim 2 wherein if the additional information is accepted as authentic by the first and second servers, at least one of the first and second servers transmits to the client device data transformable into a digital credential.

5. The method of claim 2 wherein the first server is operated by a first provider entity and the second server is operated by a second provider entity different than the first provider entity.

6. The method of claim 2 wherein the first server is configured as a front-end server which communicates with the client device and the second server is configured as a back-end server which communicates with the first server but does not require communication with the client device.

7. The method of claim 2 wherein the plurality of devices comprises the client device and n servers including the first and second servers, and wherein the client device generates a share of the first password for each of the n servers $S_i$, $1 \leq i \leq n$, as a corresponding point $p(i)$ of a random polynomial $p$, and wherein point $p(0)$ represents a hash of the first password.

8. The method of claim 7 wherein the additional information is submitted by the client device to the n servers and comprises a share of a second password for each of the n servers $S_i$, $1 \leq i \leq n$, as a corresponding point $p'(i)$ of a random polynomial $p'$, and wherein point $p'(0)$ represents a hash of the second password.

9. The method of claim 8 wherein the n servers determine if the additional information is authentic by determining if $p(0)=p'(0)$ by exchanging blinded transformations of their individual shares.

10. The method of claim 2 wherein the plurality of devices comprises the client device and n servers including the first and second servers, and wherein the client device generates a share of the first password for each of the n servers $S_i$, $1 \leq i \leq n$, as a corresponding point $p(i)$ of a random polynomial p, and a set of commitments $C=\{(p(i))^2 \bmod N\}$ to points on p, the set of commitments being sent to each of the n servers, the polynomial being defined over a ring $Z_N$ for a modulus N.

11. The method of claim 10 wherein the additional information is submitted by the client to the n servers and comprises a verifiably correct ciphertext on a second password, the servers determining a consistent version of the set of commitments and authenticating the additional information based on the commitments and the ciphertext.

12. The method of claim 1 wherein the generating and storing steps provide a registration of the first password for subsequent authentication of the additional information.

13. The method of claim 1 wherein the first and second shares comprise respective first and second elements in an algebraic group, the composition of said first and second elements under an operator of said group yielding a representation of the first password.

14. The method of claim 1 wherein the shares each comprise a representation of a corresponding information element from a set of information for one or more users, such that no single one of at least the second and third devices can feasibly determine the entire set of information.

15. The method of claim 14 wherein the set of information comprises a user profile and the information elements comprise distinct portions of the profile.

16. The method of claim 14 wherein the set of information comprises answers to a set of life questions, and the information elements comprise individual answers to particular questions in the set of life questions.

17. The method of claim 16 wherein the set of life questions is organized in accordance with a user-selectable theme.

18. The method of claim 1 wherein the first password comprises answers to a set of life questions, and the correspondence determination comprises the first and second devices utilizing the respective first and second shares to collectively verify that the additional information comprises the answers to the set of life questions.

19. The method of claim 1 wherein at least one of the second and third processing devices is configured to operate as a mix server for performing at least one of: (i) an encryption operation; (ii) a decryption operation; and (iii) a re-encryption mixing operation.

20. The method of claim 1 wherein the first and second shares comprise respective first and second seeds, and the third and fourth shares comprise shares of an output generated as a function of both the first and second seeds.

21. The method of claim 1 further comprising the step of periodically re-randomizing the shares as stored in the second and third processing devices.

22. The method of claim 1 further comprising the step of implementing in at least one of the second and third processing devices at least a portion of a mechanism for limiting denial-of-service attacks on the corresponding device or devices.

23. The method of claim 1 wherein the shares each correspond to portions of answers to a set of life questions, the additional information comprising corresponding portions of answers to the set of life questions submitted for authentication, the utilizing step being configured such that the additional information is determined to be authentic if a number of correct answers to the set of life questions exceeds a specified threshold.

24. The method of claim 1 further comprising the step of performing at least one post-authentication action on behalf of an associated user if the additional information is determined to be authentic.

25. The method of claim 1 wherein the devices storing the shares operate as a mix network in utilizing the shares to determine authenticity of the additional information.

26. A method for authenticating information in a system comprising a plurality of processing devices each adaptable for communication with one or more other devices of the plurality of devices, the method comprising the steps of:
generating at least first and second shares of a first password associated with a first device of the plurality of devices;
storing the first and second shares in respective second and third devices of the plurality of devices; and
upon submission of additional information associated with the first device to at least one of the second and third devices, each of the first and second shares having a property that it is infeasible to determine solely therefrom correspondence of the additional information with the first password, the second and third devices utilizing the respective first and second shares to collectively determine said correspondence of the additional information with the first password;
wherein third and fourth shares are computed by the respective second and third devices as a function of their respective first and second shares and at least a portion of the additional information.

27. A method for authenticating information in a system comprising a plurality of processing devices each adaptable for communication with one or more other devices of the plurality of devices, the method comprising the steps of:
generating at least first and second shares of a first password associated with a first device of the plurality of devices;
storing the first and second shares in respective second and third devices of the plurality of devices; and
upon submission of additional information associated with the first device to at least one of the second and third devices, each of the first and second shares having a property that it is infeasible to determine solely therefrom correspondence of the additional information with the first password, the second and third devices utilizing the respective first and second shares to collectively determine said correspondence of the additional information with the first password;
wherein the first device comprises a client device and wherein the second and third devices comprise respective first and second servers connectable to the client device over a network; and
wherein the generating step is implemented at least in part in the first server on behalf of the client device, the first server generating at least one of the first and second shares based on the first password, storing the first share, erasing the first password, and supplying the second share to the second server for storage therein.

28. The method of claim 27 wherein the client device transmits a client identifier to the first server; the first server determines from the client identifier, the additional information, and the first share a first piece of information and authenticates to the second server using the first piece of information; and if the second server determines from the second share that the authentication is correct, the second server releases to the first server a second piece of information.

29. The method of claim 28 wherein each of the first and second pieces of information comprises an input key for a given client account.

30. The method of claim 28 wherein the first server forwards a pair of values to the client device from which the client device derives a key.

31. A method for authenticating information in a system comprising a plurality of processing devices each adaptable for communication with one or more other devices of the plurality of devices, the method comprising the steps of:
   generating at least first and second shares of a first password associated with a first device of the plurality of devices;
   storing the first and second shares in respective second and third devices of the plurality of devices; and
   upon submission of additional information associated with the first device to at least one of the second and third devices, each of the first and second shares having a property that it is infeasible to determine solely therefrom correspondence of the additional information with the first password, the second and third devices utilizing the respective first and second shares to collectively determine said correspondence of the additional information with the first password;
   wherein the first device comprises a client device and wherein the second and third devices comprise respective first and second servers connectable to the client device over a network; and
   wherein the additional information comprises third and fourth shares of a second password associated with the client device.

32. The method of claim 31 wherein the utilizing step comprises comparing a first quantity generated by the first server as a function of the first and third shares with a second quantity generated by the second server as a function of the second and fourth shares.

33. The method of claim 32 wherein the first and second servers accept the additional information as authentic if the first quantity and the second quantity are determined to be substantially equivalent.

34. The method of claim 33 wherein substantial equivalence is determined between the first and second quantity using minimal-knowledge cryptographic techniques that determine equality between two pieces of data without revealing information about the data.

35. A method for authenticating information in a system comprising a plurality of processing devices each adaptable for communication with one or more other devices of the plurality of devices, the method comprising the steps of:
   generating at least first and second shares of a first password associated with a first device of the plurality of devices;
   storing the first and second shares in respective second and third devices of the plurality of devices; and
   upon submission of additional information associated with the first device to at least one of the second and third devices, each of the first and second shares having a property that it is infeasible to determine solely therefrom correspondence of the additional information with the first password, the second and third devices utilizing the respective first and second shares to collectively determine said correspondence of the additional information with the first password;
   wherein the first device comprises a client device and wherein the second and third devices comprise respective first and second servers connectable to the client device over a network; and
   wherein the client device is known to the second server on the basis of a pseudonym provided to the second server by the first server.

36. The method of claim 35 wherein the first server utilizes a one-way function to map client identifiers to pseudonyms, and operates in conjunction with the client device to prove to the second server for each of a plurality of authentication requests that the first server is presenting a correct corresponding pseudonym to the second server.

37. The method of claim 36 wherein the one-way function comprises a modular exponentiation function of the form $f_x$: $m \rightarrow m^x$ such that it is possible to prove a statement regarding application of the function by employing a cryptographic zero-knowledge or minimum-knowledge proof technique.

38. The method of claim 37 wherein the client device generates shares of a client identifier, computes commitments on the shares and transmits information sufficient to determine the commitments to the first server; the first server transmits to the second server information sufficient to determine the pseudonym and the pseudonym values generated by application of the one-way function to the shares; the second server computes the pseudonym and transmits one or more challenge bits to the first server; and the first server reveals the share of the client identifier corresponding to the one or more challenge bits to the second server and proves to the second server using the proof technique that the share of the pseudonym corresponding to the one or more challenge bits is consistent with application of the one-way function to the share of the client identifier corresponding to the one or more challenge bits.

39. The method of claim 38 wherein the client device generates an authentication of its commitment to the shares, the authentication being deliverable by the first server to the second server and verifiable by the second server.

40. The method of claim 36 wherein the client device generates a ciphertext on a function of the pseudonym without knowledge of the pseudonym, generates an authentication of the ciphertext that is verifiable by the second server, and sends the ciphertext and the authentication to the first server; and the first server sends to the second server information sufficient to determine (i) the pseudonym, (ii) the ciphertext and (ii) the authentication, along with a proof that the function of the pseudonym is a plaintext corresponding to the ciphertext.

41. The method of claim 36 wherein the second server verifies a correctness of a pseudonym presented to it by the first server, by utilizing at least one commitment on (i) at least one corresponding client identifier and (ii) at least one witness element determinable by the first server, such that the first server can prove the correctness of the pseudonym to the second server by determining the witness element and presenting it to the second server.

42. The method of claim 36 wherein the second server maintains a record of authentication requests received within a designated time window, and the client device includes a time-dependent value in a given authentication request, the time-dependent value being cryptographically bound to any subsequent authentication request generated by the client device within a given session, the second server rejecting as expired any authentication request having a time-dependent value falling outside the designated time window.

43. An apparatus comprising a processing device having a processor coupled to a memory, the processing device being one of a plurality of processing devices each adaptable for communication with one or more other devices of the plurality of devices, the processing device being utilizable in a system in which at least first and second shares of a first password associated with a first device of the plurality of devices are stored in respective second and third devices of the plurality of devices, and in which, upon submission of additional information associated with the first device to at least one of the second and third devices, each of the first and second shares having a property that it is infeasible to determine solely therefrom correspondence of the additional information with the first password, the second and third devices utilize the respective first and second shares to collectively determine said correspondence of the additional information with the first password, wherein the additional information comprises a third share and a fourth share, the third share being delivered by the first device to the second device, the fourth share being delivered by the first device to the third device.

44. A machine-readable storage medium for storing one or more software programs for use in authenticating information in a system comprising a plurality of processing devices each adaptable for communication with one or more other devices of the plurality of devices, wherein the one or more software programs when executed by a first device of the plurality of devices implement the step of:

generating at least first and second shares of a first password associated with the first device;

wherein the first and second shares are stored in respective second and third devices of the plurality of devices;

wherein upon submission of additional information associated with the first device to at least one of the second and third devices, each of the first and second shares having a property that it is infeasible to determine solely therefrom correspondence of the additional information with the first password, the second and third devices utilize the respective first and second shares to collectively determine said correspondence of the additional information with the first password; and wherein the additional information comprises a third share and a fourth share, the third share being delivered by the first device to the second device, the fourth share being delivered by the first device to the third device.

45. A method for authenticating information in a system comprising a plurality of processing devices each adaptable for communication with one or more other devices of the plurality of devices, the method comprising the steps of:

storing shares of a password in the system such that the shares are each stored in a corresponding one of the plurality of devices; and utilizing the shares to determine authenticity of additional information submitted to at least one of the devices, in a manner which ensures that no particular one of the devices storing the shares can determine correspondence between the additional information and the password;

wherein a submitter of the additional information is known to at least a given one of the devices storing the shares on the basis of a pseudonym provided to the given one of the devices by another one of the devices.

46. A method for authenticating information in a system comprising a plurality of processing devices each adaptable for communication with one or more other devices of the plurality of devices, the method comprising the step of:

a first one of the plurality of devices submitting information to at least a second one of the plurality of devices;

wherein the second device interacts with at least a third one of the plurality of devices to determine if the submitted information is authentic;

wherein the first device is identified to the third device by a pseudonym provided by the second device; and wherein the second device utilizes a one-way function to map user identifiers to pseudonyms, and operates in conjunction with the first device to prove to the third device for each of a plurality of authentication requests that the second device is presenting the appropriate corresponding pseudonym to the third device.

* * * * *

UNITED STATES PATENT AND TRADEMARK OFFICE
CERTIFICATE OF CORRECTION

PATENT NO. : 7,725,730 B2  
APPLICATION NO. : 10/216030  
DATED : May 25, 2010  
INVENTOR(S) : Juels et al.

Page 1 of 10

It is certified that error appears in the above-identified patent and that said Letters Patent is hereby corrected as shown below:

The title page, showing an illustrative figure, should be deleted and substitute therefor the attached title page.

Delete drawing sheets 1-7 and substitute therefor the drawing sheets, consisting of figures 1-8 as shown on the attached pages.

Please delete column 29-30 line 1 through 67 and insert column 29-30 line 1-67 as attached.

Signed and Sealed this  
Twenty-second Day of February, 2011

David J. Kappos  
*Director of the United States Patent and Trademark Office*

(12) United States Patent
Juels et al.

(10) Patent No.: US 7,725,730 B2
(45) Date of Patent: May 25, 2010

(54) CRYPTOGRAPHIC METHODS AND APPARATUS FOR SECURE AUTHENTICATION

(75) Inventors: Ari Juels, Brookline, MA (US); Burton S. Kaliski, Jr., Wellesley, MA (US)

(73) Assignee: EMC Corporation, Hopkinton, MA (US)

(*) Notice: Subject to any disclaimer, the term of this patent is extended or adjusted under 35 U.S.C. 154(b) by 2014 days.

(21) Appl. No.: 10/216,030

(22) Filed: Aug. 9, 2002

(65) Prior Publication Data
US 2004/0030932 A1    Feb. 12, 2004

(51) Int. Cl.
| | |
|---|---|
| H04L 29/06 | (2006.01) |
| H04L 9/32 | (2006.01) |
| G06F 21/00 | (2006.01) |
| G06F 7/04 | (2006.01) |
| G06F 12/14 | (2006.01) |
| G08B 29/00 | (2006.01) |

(52) U.S. Cl. .............. 713/183; 713/151; 713/161; 713/168; 713/170; 713/184; 726/5; 726/7; 726/18; 726/19; 726/22; 726/28; 726/29; 726/30; 340/5.85

(58) Field of Classification Search .......... 726/5, 726/7, 18, 19, 22, 28–30; 713/151, 161, 713/168, 170, 183, 184; 340/5.85
See application file for complete search history.

(56) References Cited

U.S. PATENT DOCUMENTS

| | | |
|---|---|---|
| 5,778,065 A | 7/1998 | Hauser et al. |
| 5,862,323 A | 1/1999 | Blakley, III et al. |
| 6,292,896 B1* | 9/2001 | Guski et al. ............ 713/169 |
| 6,802,000 B1 | 10/2004 | Greene et al. |
| 6,904,529 B1* | 6/2005 | Swander ............ 726/14 |
| 6,959,394 B1* | 10/2005 | Brickell et al. ........... 380/44 |
| 6,978,385 B1* | 12/2005 | Cheston et al. ............ 340/5.85 |
| 6,983,377 B1 | 1/2006 | Beesley et al. |
| 6,986,039 B1 | 1/2006 | Leah et al. |
| 6,996,719 B2 | 2/2006 | Riordan |

(Continued)

FOREIGN PATENT DOCUMENTS

WO    PCTUS0325099    7/2008

OTHER PUBLICATIONS

Schneier, Bruce, Applied Cryptography, 1996, John Wiley & Sons, Inc., Second Edition, pp. 101-104.*

(Continued)

*Primary Examiner*—Aravind K Moorthy
(74) *Attorney, Agent, or Firm*—Ryan, Mason & Lewis, LLP

(57) ABSTRACT

Secure authentication protocols, particularly well-suited for use in authenticating mobile communications devices having limited computational resources, are disclosed. In an illustrative embodiment, a network-based communication system includes a client device and at least two servers. First and second shares are generated from a first password associated with the client device, and stored in respective first and second servers. The client device submits additional information associated therewith to at least one of the first and second servers. Each of the first and second shares has the property that it is infeasible to determine solely therefrom correspondence of the additional information with the first password. The first and second servers then utilize the respective first and second shares to collectively determine said correspondence of the additional information with the first password.

46 Claims, 6 Drawing Sheets

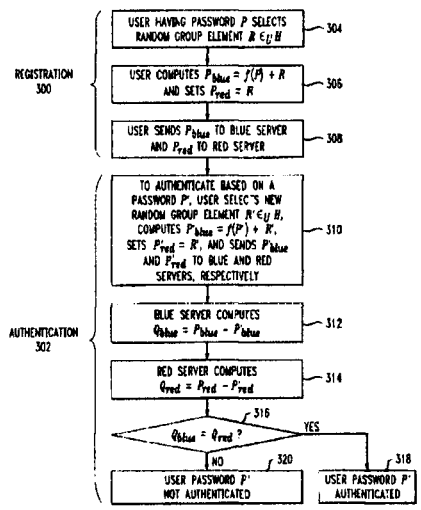

servers, particularly the life-question variant. Thus, another security issue to be considered is that of denial-of-service attacks. An attacker may seek to cause service to be denied to honest users through a combination of guessing attacks against legitimate accounts, resulting in account lockdowns and perhaps some account compromise, and rapid submission of authentication requests, yielding an unsustainable computational burden on the servers. We now describe several approaches to dealing with these kinds of denial-of-service attacks.

One approach to forestalling denial-of-service attacks is to identify the source of a presumed attack by means of IP tracing and to throttle service to suspect IP addresses. For example, a mechanism to facilitate reliable IP tracing is provided by Syncookies, as described at D. J. Bernstein, http://cr.yp.to/syncookies.html, 2002, which is incorporated by reference herein, and is now a standard part of current Linux and FreeBSD operating systems. IP tracing can be of limited utility in some cases, however, as attackers may seek to mount attacks via multiple IP addresses or through IP addresses shared with large bases of honest users.

Another approach to throttling denial-of-service attacks is to impose a resource charge on authenticating clients when an attack is detected. For example, in the "client puzzle" approach described in A. Juels and J. Brainard, "Client Puzzles: A Cryptographic Countermeasure Against Connection Depletion Attacks," Networks and Distributed System Security, S. Kent, editor, pp. 151-165, 1999, which is incorporated by reference herein, clients are required to submit correct solutions to moderately hard cryptographic "puzzles" in order to gain service. This has the effect of requiring an attacker to amass considerable computational resources in order to mount an attack. Client puzzles are therefore of very limited utility against an attacker mounting a large-scale distributed denial-of-service attack.

In an alternative, allied approach, the resource required of clients might be that of active human participation in the authentication process. This approach has been adopted by a number of Web sites, which require users to solve problems based on optical character recognition (OCR) within a certain time limit in order to obtain service. These problems are believed to be effectively insoluble by computers, but relatively easy for human beings. For an example, see the URL submission service on Altavista, http://addurl.altavista.com/sites/addurl/newurl.

An alternative to locking down a given account after a number of unsuccessful login attempts is to deny authentication requests to that account for a certain period of time. This may have the effect of slowing a guessing attack on the part of an attacker with knowledge of only a small set of account identifiers. An attacker with a list of many account identifiers, however, can simply sweep through this list, attacking a given account until a delay is imposed, and then moving to a new one.

Denial-of-service attacks involving account lockdowns can be aggravated by erroneous login attempts by honest users. In particular, such honest users will unintentionally increment counts of failed authentication attempts. In systems that register the total number of failures against individual accounts over time, this may result in hastened lockdown of accounts. A partial solution to this problem is offered by the "apology" mechanism described in D. P. Jablon, "Password Authentication Using Multiple Servers," Topics in Cryptology—CT-RSA 2001, LNCS No. 2020, D. Naccache, editor, Springer-Verlag, pp. 344-360, 2001, which is incorporated by reference herein. This proposal is as follows. On authenticating successfully, a user can acknowledge his or her previous erroneous attempts, thereby removing these from the record of failed attempts against the corresponding user account.

It should again be emphasized that the particular secure authentication techniques described above are provided by way of illustration, and should not be construed as limiting the present invention to any specific embodiment or group of embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for authenticating information in a system comprising a plurality of processing devices each adaptable for communication with one or more other devices of the plurality of devices, the method comprising the steps of:
generating at least first and second shares of a first password associated with a first device of the plurality of devices;
storing the first and second shares in respective second and third devices of the plurality of devices; and
upon submission of additional information associated with the first device to at least one of the second and third devices, each of the first and second shares having a property that it is infeasible to determine solely therefrom correspondence of the additional information with the first password, the second and third devices utilizing the respective first and second shares to collectively determine said correspondence of the additional information with the first password;
wherein the additional information comprises a third share and a fourth share, the third share being delivered by the first device to the second device, the fourth share being delivered by the first device to the third device.

2. The method of claim 1 wherein the first device comprises a client device and wherein the second and third devices comprise respective first and second servers connectable to the client device over a network.

3. The method of claim 2 wherein the generating step is implemented in the client device and the first and second shares are supplied by the client device to the respective first and second servers for storage therein.

4. The method of claim 2 wherein if the additional information is accepted as authentic by the first and second servers, at least one of the first and second servers transmits to the client device data transformable into a digital credential.

5. The method of claim 2 wherein the first server is operated by a first provider entity and the second server is operated by a second provider entity different than the first provider entity.

6. The method of claim 2 wherein the first server is configured as a front-end server which communicates with the client device and the second server is configured as a back-end server which communicates with the first server but does not require communication with the client device.

7. The method of claim 2 wherein the plurality of devices comprises the client device and n servers including the first and second servers, and wherein the client device generates a share of the first password for each of the n servers $S_i$, $1 \leq i \leq n$, as a corresponding point $p(i)$ of a random polynomial $p$, and wherein point $p(0)$ represents a hash of the first password.

8. The method of claim 7 wherein the additional information is submitted by the client device to the n servers and comprises a share of a second password for each of the n

UNITED STATES PATENT AND TRADEMARK OFFICE
CERTIFICATE OF CORRECTION

| | | |
|---|---|---|
| PATENT NO. | : 7,725,730 B2 | |
| APPLICATION NO. | : 10/216030 | |
| DATED | : May 25, 2010 | |
| INVENTOR(S) | : Juels et al. | |

It is certified that error appears in the above-identified patent and that said Letters Patent is hereby corrected as shown below:

The title page, showing an illustrative figure, should be deleted and substitute therefor the attached title page.

Delete drawing sheets 1-7 and substitute therefor the drawing sheets, consisting of figures 1-8 as shown on the attached pages.

Please delete column 29-30 line 1 through 67 and insert column 29-30 line 1-67 as attached.

This certificate supersedes the Certificate of Correction issued February 22, 2011.

Signed and Sealed this
Twenty-sixth Day of July, 2011

David J. Kappos
*Director of the United States Patent and Trademark Office*

(12) United States Patent
Juels et al.

(10) Patent No.: US 7,725,730 B2
(45) Date of Patent: May 25, 2010

(54) CRYPTOGRAPHIC METHODS AND APPARATUS FOR SECURE AUTHENTICATION

(75) Inventors: Ari Juels, Brookline, MA (US); Burton S. Kaliski, Jr., Wellesley, MA (US)

(73) Assignee: EMC Corporation, Hopkinton, MA (US)

( * ) Notice: Subject to any disclaimer, the term of this patent is extended or adjusted under 35 U.S.C. 154(b) by 2014 days.

(21) Appl. No.: 10/216,030

(22) Filed: Aug. 9, 2002

(65) Prior Publication Data
US 2004/0030932 A1 Feb. 12, 2004

(51) Int. Cl.
| H04L 29/06 | (2006.01) |
| H04L 9/32 | (2006.01) |
| G06F 21/00 | (2006.01) |
| G06F 7/04 | (2006.01) |
| G06F 12/14 | (2006.01) |
| G08B 29/00 | (2006.01) |

(52) U.S. Cl. ............... 713/183; 713/151; 713/161; 713/168; 713/170; 713/184; 726/5; 726/7; 726/18; 726/19; 726/22; 726/28; 726/29; 726/30; 340/5.85

(58) Field of Classification Search ......... 726/5, 726/7, 18, 19, 22, 28–30; 713/151, 161, 713/168, 170, 183, 184; 340/5.85
See application file for complete search history.

(56) References Cited

U.S. PATENT DOCUMENTS

| 5,778,065 | A | 7/1998 | Hauser et al. |
| 5,862,323 | A | 1/1999 | Blakley, III et al. |
| 6,292,896 | B1 * | 9/2001 | Guski et al. ............ 713/169 |
| 6,802,000 | B1 | 10/2004 | Greene et al. |
| 6,904,529 | B1 * | 6/2005 | Swander ............ 726/14 |
| 6,959,394 | B1 * | 10/2005 | Brickell et al. ............ 380/44 |
| 6,978,385 | B1 * | 12/2005 | Cheston et al. ............ 340/5.85 |
| 6,983,377 | B1 | 1/2006 | Beesley et al. |
| 6,986,039 | B1 | 1/2006 | Leah et al. |
| 6,996,719 | B2 | 2/2006 | Riordan |

(Continued)

FOREIGN PATENT DOCUMENTS

WO PCTUS0325099 7/2008

OTHER PUBLICATIONS

Schneier, Bruce, Applied Cryptography, 1996, John Wiley & Sons, Inc., Second Edition, pp. 101-104.*

(Continued)

*Primary Examiner*—Aravind K Moorthy
(74) *Attorney, Agent, or Firm*—Ryan, Mason & Lewis, LLP

(57) ABSTRACT

Secure authentication protocols, particularly well-suited for use in authenticating mobile communications devices having limited computational resources, are disclosed. In an illustrative embodiment, a network-based communication system includes a client device and at least two servers. First and second shares are generated from a first password associated with the client device, and stored in respective first and second servers. The client device submits additional information associated therewith to at least one of the first and second servers. Each of the first and second shares has the property that it is infeasible to determine solely therefrom correspondence of the additional information with the first password. The first and second servers then utilize the respective first and second shares to collectively determine said correspondence of the additional information with the first password.

46 Claims, 6 Drawing Sheets

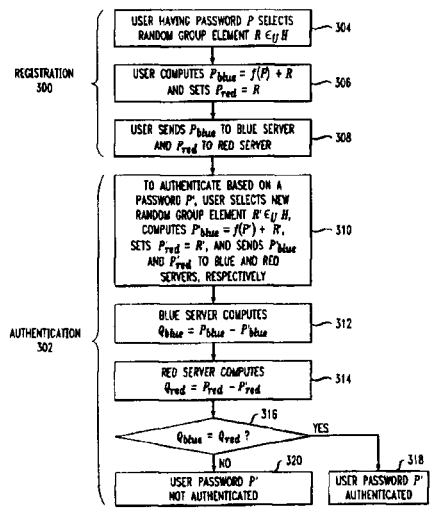

servers, particularly the life-question variant. Thus, another security issue to be considered is that of denial-of-service attacks. An attacker may seek to cause service to be denied to honest users through a combination of guessing attacks against legitimate accounts, resulting in account lockdowns and perhaps some account compromise, and rapid submission of authentication requests, yielding an unsustainable computational burden on the servers. We now describe several approaches to dealing with these kinds of denial-of-service attacks.

One approach to forestalling denial-of-service attacks is to identify the source of a presumed attack by means of IP tracing and to throttle service to suspect IP addresses. For example, a mechanism to facilitate reliable IP tracing is provided by Syncookies, as described at D. J. Bernstein, http://cr.yp.to/syncookies.html, 2002, which is incorporated by reference herein, and is now a standard part of current Linux and FreeBSD operating systems. IP tracing can be of limited utility in some cases, however, as attackers may seek to mount attacks via multiple IP addresses or through IP addresses shared with large bases of honest users.

Another approach to throttling denial-of-service attacks is to impose a resource charge on authenticating clients when an attack is detected. For example, in the "client puzzle" approach described in A. Juels and J. Brainard, "Client Puzzles: A Cryptographic Countermeasure Against Connection Depletion Attacks," Networks and Distributed System Security, S. Kent, editor, pp. 151-165, 1999, which is incorporated by reference herein, clients are required to submit correct solutions to moderately hard cryptographic "puzzles" in order to gain service. This has the effect of requiring an attacker to amass considerable computational resources in order to mount an attack. Client puzzles are therefore of very limited utility against an attacker mounting a large-scale distributed denial-of-service attack.

In an alternative, allied approach, the resource required of clients might be that of active human participation in the authentication process. This approach has been adopted by a number of Web sites, which require users to solve problems based on optical character recognition (OCR) within a certain time limit in order to obtain service. These problems are believed to be effectively insoluble by computers, but relatively easy for human beings. For an example, see the URL submission service on Altavista, http://addurl.altavista.com/sites/addurl/newurl.

An alternative to locking down a given account after a number of unsuccessful login attempts is to deny authentication requests to that account for a certain period of time. This may have the effect of slowing a guessing attack on the part of an attacker with knowledge of only a small set of account identifiers. An attacker with a list of many account identifiers, however, can simply sweep through this list, attacking a given account until a delay is imposed, and then moving to a new one.

Denial-of-service attacks involving account lockdowns can be aggravated by erroneous login attempts by honest users. In particular, such honest users will unintentionally increment counts of failed authentication attempts. In systems that register the total number of failures against individual accounts over time, this may result in hastened lockdown of accounts. A partial solution to this problem is offered by the "apology" mechanism described in D. P. Jablon, "Password Authentication Using Multiple Servers," Topics in Cryptology—CT-RSA 2001, LNCS No. 2020, D. Naccache, editor, Springer-Verlag, pp. 344-360, 2001, which is incorporated by reference herein. This proposal is as follows. On authenticating successfully, a user can acknowledge his or her previous erroneous attempts, thereby removing these from the record of failed attempts against the corresponding user account.

It should again be emphasized that the particular secure authentication techniques described above are provided by way of illustration, and should not be construed as limiting the present invention to any specific embodiment or group of embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for authenticating information in a system comprising a plurality of processing devices each adaptable for communication with one or more other devices of the plurality of devices, the method comprising the steps of:
generating at least first and second shares of a first password associated with a first device of the plurality of devices;
storing the first and second shares in respective second and third devices of the plurality of devices; and
upon submission of additional information associated with the first device to at least one of the second and third devices, each of the first and second shares having a property that it is infeasible to determine solely therefrom correspondence of the additional information with the first password, the second and third devices utilizing the respective first and second shares to collectively determine said correspondence of the additional information with the first password;
wherein the additional information comprises a third share and a fourth share, the third share being delivered by the first device to the second device, the fourth share being delivered by the first device to the third device.

2. The method of claim 1 wherein the first device comprises a client device and wherein the second and third devices comprise respective first and second servers connectable to the client device over a network.

3. The method of claim 2 wherein the generating step is implemented in the client device and the first and second shares are supplied by the client device to the respective first and second servers for storage therein.

4. The method of claim 2 wherein if the additional information is accepted as authentic by the first and second servers, at least one of the first and second servers transmits to the client device data transformable into a digital credential.

5. The method of claim 2 wherein the first server is operated by a first provider entity and the second server is operated by a second provider entity different than the first provider entity.

6. The method of claim 2 wherein the first server is configured as a front-end server which communicates with the client device and the second server is configured as a back-end server which communicates with the first server but does not require communication with the client device.

7. The method of claim 2 wherein the plurality of devices comprises the client device and n servers including the first and second servers, and wherein the client device generates a share of the first password for each of the n servers $S_i$, $1 \leq i \leq n$, as a corresponding point $p(i)$ of a random polynomial $p$, and wherein point $p(0)$ represents a hash of the first password.

8. The method of claim 7 wherein the additional information is submitted by the client device to the n servers and comprises a share of a second password for each of the n